US012585653B2

(12) United States Patent
Rosno et al.

(10) Patent No.: US 12,585,653 B2
(45) Date of Patent: Mar. 24, 2026

(54) PARSING IMPLICIT TABLES

(71) Applicant: Unisys Corporation, Blue Bell, PA (US)

(72) Inventors: Mark Rosno, Eagan, MN (US);
Patrick Deziel, Eagan, MN (US);
Christopher Korzenowski, Eagan, MN
(US); Rebecca Bilbro, Eagan, MN
(US); Kelsey L Bruso, Eagan, MN
(US); Robert Malek, Eagan, MN (US)

(73) Assignee: Unisys Corporation, Blue Bell, PA
(US)

( * ) Notice: Subject to any disclaimer, the term of this
patent is extended or adjusted under 35
U.S.C. 154(b) by 129 days.

(21) Appl. No.: 17/478,948

(22) Filed: Sep. 19, 2021

(65) Prior Publication Data

US 2022/0121814 A1 Apr. 21, 2022

Related U.S. Application Data

(60) Provisional application No. 63/094,148, filed on Oct.
20, 2020.

(51) Int. Cl.
| | |
|---|---|
| *G06F 16/3329* | (2025.01) |
| *G06F 16/245* | (2019.01) |
| *G06F 16/2453* | (2019.01) |
| *G06F 16/2457* | (2019.01) |
| *G06F 16/93* | (2019.01) |
| *G06F 40/205* | (2020.01) |
| *G06F 40/30* | (2020.01) |
| *G06F 40/40* | (2020.01) |
| *G06N 3/08* | (2023.01) |

(52) U.S. Cl.
CPC ...... *G06F 16/24549* (2019.01); *G06F 16/245*
(2019.01); *G06F 16/24578* (2019.01); *G06F*
*16/3329* (2019.01); *G06F 16/93* (2019.01);
*G06F 40/205* (2020.01); *G06F 40/30*
(2020.01); *G06F 40/40* (2020.01); *G06N 3/08*
(2013.01)

(58) Field of Classification Search
CPC ...... G06F 40/205; G06F 40/30; G06F 40/103;
G06F 40/117; G06F 40/131; G06F
40/258; G06F 40/183; G06F 40/186
See application file for complete search history.

(56) References Cited

U.S. PATENT DOCUMENTS

| | | |
|---|---|---|
| 2016/0364377 A1 | 12/2016 | Krishnamurthy |
| 2017/0053025 A1 | 2/2017 | De Sousa Webber |
| 2018/0336183 A1 | 11/2018 | Lee et al. |
| 2019/0236134 A1* | 8/2019 | Galitsky ............... G06F 40/131 |
| 2019/0266257 A1 | 8/2019 | Natchu et al. |

(Continued)

OTHER PUBLICATIONS

Reimers et al., "Sentence-BERT: Sentence Embeddings using Sia-
mese BERT-Networks", Available online at: <https://arxiv.org/pdf/
1908.10084>, Aug. 27, 2019, 11 pages.

*Primary Examiner* — Thomas H Maung
(74) *Attorney, Agent, or Firm* — Shook, Hardy & Bacon

(57) ABSTRACT

A method of parsing implicit tables within a document
includes parsing, by a processor, a document to determine a
pattern for a set of text that sets apart the information
contained therein from the rest of the text; determining, by
the processor, from the pattern of spacing, a first descriptive
phrase and a second descriptive phrase; and assigning, by
the processor, the first descriptive phrase as an action and the
second descriptive phrase as a trigger.

18 Claims, 30 Drawing Sheets

(56)                    References Cited

U.S. PATENT DOCUMENTS

| | | | |
|---|---|---|---|
| 2019/0325029 A1 | 10/2019 | Gandhi et al. | |
| 2020/0050638 A1* | 2/2020 | Hancock | G06F 16/90344 |
| 2020/0133967 A1 | 4/2020 | Shukla et al. | |
| 2020/0175962 A1 | 6/2020 | Thomson et al. | |
| 2020/0327378 A1 | 10/2020 | Smith et al. | |
| 2021/0004714 A1 | 1/2021 | Neumann | |
| 2021/0005316 A1 | 1/2021 | Neumann | |
| 2021/0117780 A1 | 4/2021 | Malik et al. | |
| 2021/0240776 A1 | 8/2021 | Jawagal et al. | |
| 2021/0295822 A1 | 9/2021 | Tomkins et al. | |

* cited by examiner

| Result | Action | Trigger | Confidence Score | Details |
|--------|--------|---------|------------------|---------|
| 1 | LC | Controls setting of TPM (ON or OFF) | 82.13% | ( ... ) ~202 |
| 2 | LB | Controls the TPM mask settings | 78.98% | ( ... ) |
| 3 | SM | Handles symbiont devices | 72.72% | ( ... ) |
| 4 | CS | Sets and releases the hold conditions | 69.73% | ( ... ) |
| 5 | DISPLVL | Displays active DISPLVL switching priorities by category | 67.66% | ( ... ) |
| 6 | BP | Controls the breakpoint setting | 67.24% | ( ... ) |
| 7 | RV | Reserves components | 66.4% | ( ... ) |
| 8 | XPCDUMP | Dumps XPC storage | 66.09% | ( ... ) |
| 9 | TF | Initializes TIP File Control | 65.87% | ( ... ) |
| 10 | UP | Brings up components | 65.78% | ( ... ) |

| Result | File Name | Details |
|---|---|---|
| 1 | 78334455-020_207 | This subsection contains tables that illustrate the mask bit settings for TPM$CTRL and TPM$PGM$OPTS record types in TPM system, product, and user masks. Mask Bit Settings in TPM System Records Table 14-11 lists the mask bit settings in TPM system... |
| 2 | 68919166-011_132 | This subsection contains tables that illustrate the mask bit settings for TPM$CTRL record types in TPM system, product, and user masks. Mask Bit Settings in TPM System Records Table lists the mask bit settings in TPM system records. Table MaskBit... |
| 3 | 78307881-030_409 | Table illustrates the masks used to control TPM record selection: Table Masks to Control TPM Record Selection The combinations of these masks determine which TPM records are collected for a program. The system mask consists of a mandatory and an... |
| 4 | 78334455-020_204 | The TPM$PGM$OPTS call interface provides an extended mode interface that can be used to read or change a TPM settings. Description TPM$PGM$OPTS provides the following functions: READ_PROGRAM MASK (function 1) Allows and individual transaction or... |
| 5 | 78307881-030_414 | TPM settings can be set and cleared with different mechanisms. The system settings can be changed with the LB keyin or the TPM$CTRL call interface. They can also be configured with the TPM SGSs: TPMMSK, TPMPRDMSK, TPMUSRMSK, and TPMSTATE (refer... |

501 ⌇ ( Start )

502 ⌇ Get Next Document In Corpus

504 ⌇ Select Sentences From Document Into CORPUS-SENTENCE Set

⌇ 500

506 ⌇ More Documents In Corpus?     YES

NO

508 ⌇ ( Done )

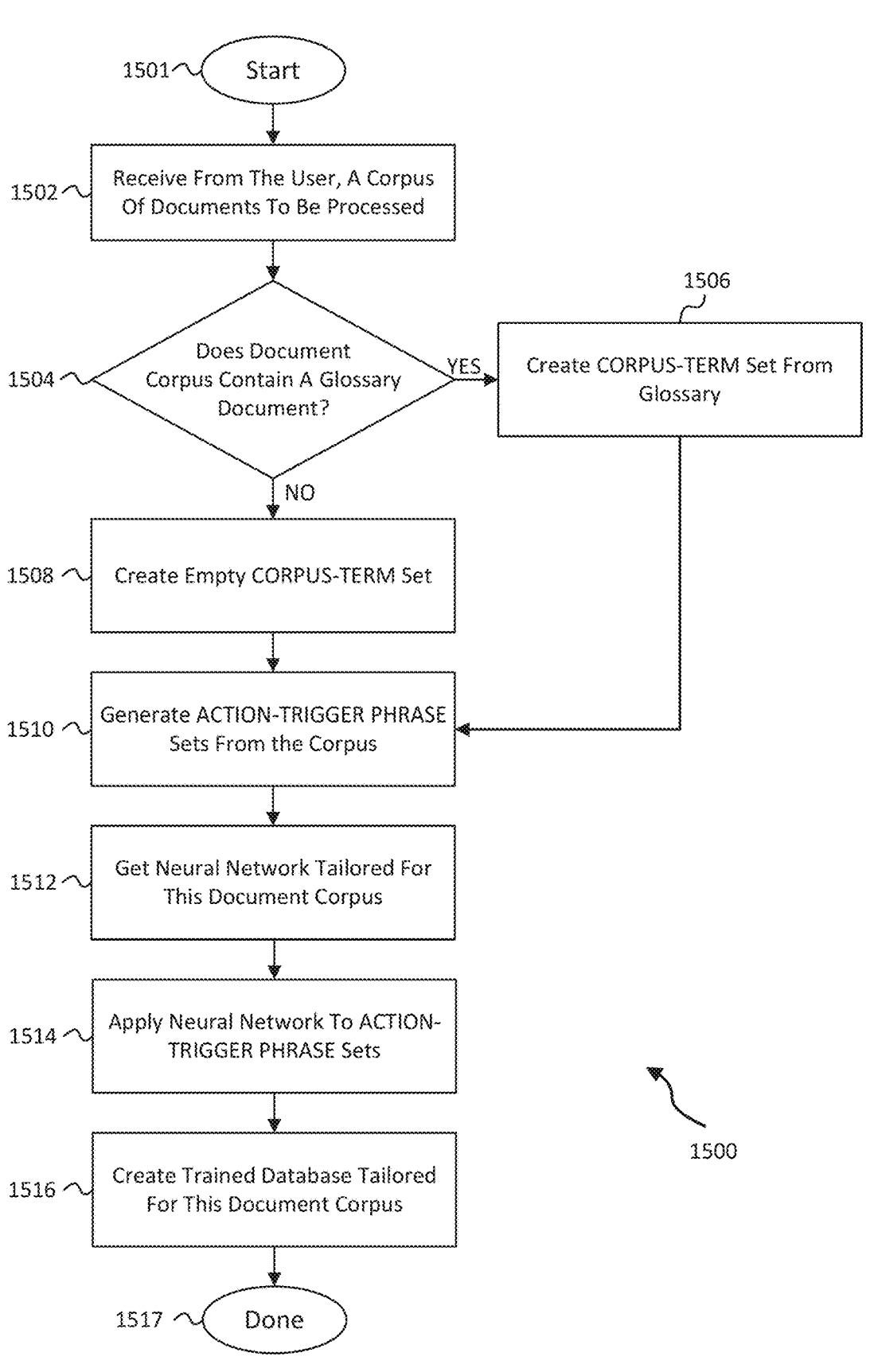

1501 — Start

1502 — Receive From The User, A Corpus Of Documents To Be Processed

1504 — Does Document Corpus Contain A Glossary Document?

1506 — Create CORPUS-TERM Set From Glossary

YES

NO

1508 — Create Empty CORPUS-TERM Set

1510 — Generate ACTION-TRIGGER PHRASE Sets From the Corpus

1512 — Get Neural Network Tailored For This Document Corpus

1514 — Apply Neural Network To ACTION-TRIGGER PHRASE Sets

1500

1516 — Create Trained Database Tailored For This Document Corpus

1517 — Done

PARSING IMPLICIT TABLES

FIELD OF THE DISCLOSURE

The present application relates generally to information retrieval, and more particularly to facilitating semantic search and response.

BACKGROUND

Commercial information retrieval systems have evolved significantly in the last several decades from search engines that introduced graph-based algorithms for sifting through millions of webpages to return relevant responses, to NoSQL databases that integrate document search and retrieval as first-class features, to cognitive systems that aim to transform documents into interactive question and answer applications. The primary challenge of building language data products with off-the-shelf tools is that language data is incredibly complex, producing high-dimensional, sparse vectors that present significant encoding challenges. In addition, as opposed to formal language, natural language encodes meaning not in individual tokens but contextually. For example, the term "ship" can function as both a verb and a noun, and depending on context it could be a synonym for the term "transport" or an acronym for a longer noun phrase (e.g. "software hint implementation proposal"). In the construction of context and domain specific language products, these contextual semantics must be preserved to successfully automate technical question and answer systems. Therefore, improvements in semantic searching and response are desired.

SUMMARY

In a first aspect of the present invention, a method of parsing implicit tables within a document includes parsing, by a processor, a document to determine a pattern for a set of text that sets apart the information contained therein from the rest of the text; determining, by the processor, from the pattern of spacing, a first descriptive phrase and a second descriptive phrase; and assigning, by the processor, the first descriptive phrase as an action and the second descriptive phrase as a trigger.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE FIGURES

For a more complete understanding of the disclosed system and methods, reference is now made to the following descriptions taken in conjunction with the accompanying drawings.

FIG. 2 is a screen shot illustrating the results of a search, according to one embodiment of the present invention;

FIG. 3 is a screen shot of details of a part of the search of FIG. 2, according to one embodiment of the present invention;

FIG. 15 is a flow diagram, according to one example embodiment of the present invention;

DETAILED DESCRIPTION

Figure 1:
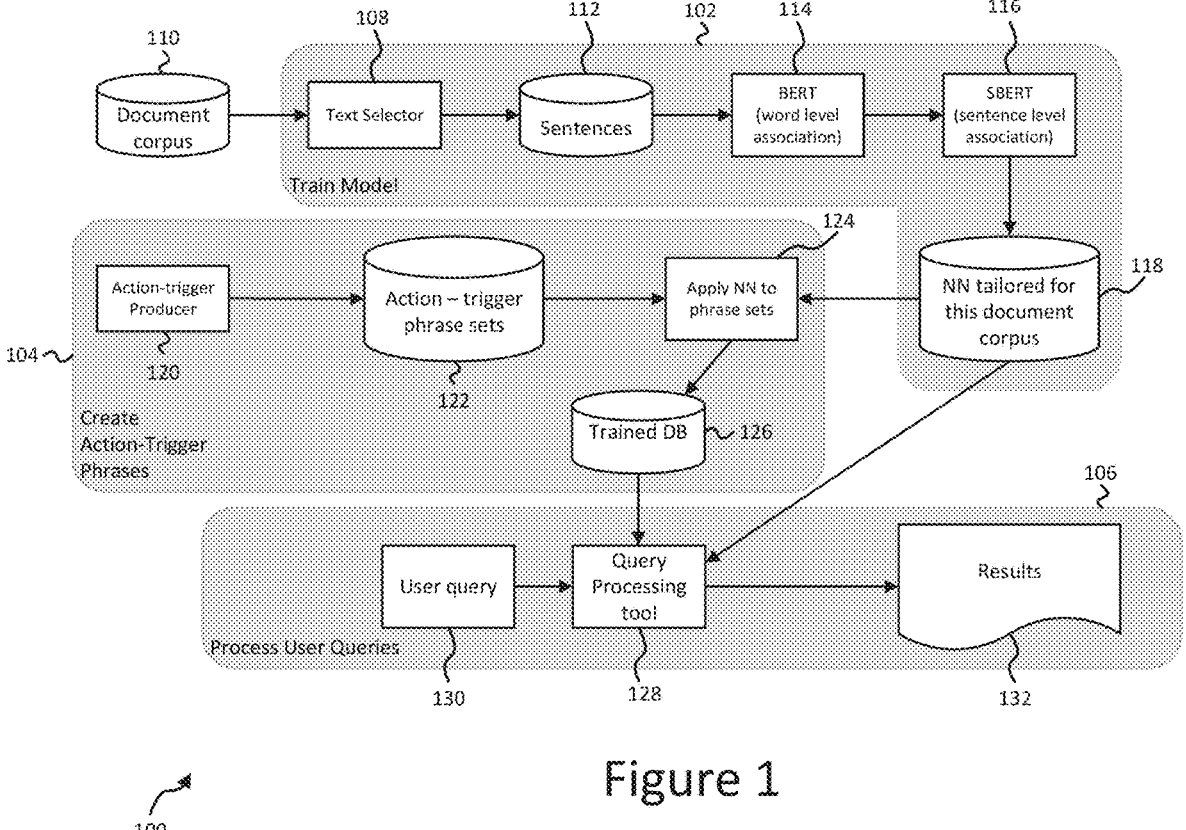
FIG. 1 is a block diagram illustrating a semantic search and response system, according to one embodiment of the present invention.

In one embodiment, a novel approach to information retrieval is contemplated for facilitating semantic search and response over a large domain of technical documents is disclosed. First, the grammar and morphology of the statements and instructions expressed in the technical documents is used to filter training data to extract the text that is most information-rich —that is the text that contains domain-specific jargon, in context. This training data is then vectorized and fed as input to an SBERT neural network model that learns an embedding of related words and terms in the text, i.e. the relationship between a given set of words contained in a user's query and the instructions from the technical documentation text most likely to assist in the user's operations.

The query processing system leverages BERT (Bidirectional Encoder Representations from Transformers). BERT includes various techniques for training general purpose language representation models using enormous piles of unannotated text on the web ("pre-training"). These general purpose pre-trained models can then be fine tuned on smaller task-specific datasets, e.g. when working problems like question answering and sentiment analysis. BERT generates a representation of each word that is based on the other words in the sentence. BERT considers both the words that follow and the words that precede.

The query processing system also leverages SBERT (Sentence BERT). SBERT uses sentence pair regression tasks like semantic textual similarity (STS). SBERT uses Siamese and triplet network structures. Multiple data sources are passed simultaneously in the same trainable transformer structure. SBERT derives semantically meaningful sentence embeddings that can be compared with cosine-similarity.

There are two parsing tasks. The first is to select a minimal sample of sentences from the document corpus that capture the domain-specific terminology (jargon). The result is a set of sentences used to train BERT and SBERT. The primary source for domain-specific terms is the glossary, the table of contents, indexes and explicit tables. The second parsing task is to create a set of action-trigger phrases from the document corpus. The trigger potentially matches a user query and the action is the related task. The primary sources include the glossary, table of contents, index, cross references, highlights, explicit tables and implicit tables. As an example, in a glossary, the glossary term would be the action and the chosen sentence would be the trigger. In a table of contents, the action can be the heading text and the trigger can be the next sentence. In an index, the index term can be the action while the sentence containing the index term is the trigger. For cross references, the action can be the cross reference and the trigger can be the cross reference source sentence. SYNSET can be used to find synonyms and cosine similarity technology can be used to find the related text on the target section or page.

Generated triggers are encoded using the pretrained SBERT model. The resulting embeddings are stored on disk for repeated use. When the user makes a query to the application, the query is encoded using the pre-trained SBERT model. A cosine similarity score is computed between the embedded query and each embedded trigger. The cosine scores are sorted to yield a ranked list of action-trigger phrase sets.

Model metrics can be gathered for each user-entered query. A cosine score of top results is used and the max, min and mean scores are gathered. The user's behavior can also be collected to identify links that were clicked and track related searches in the user session. Metric results can be evaluated to identify low performing queries. The query results can be evaluated offline periodically by a domain expert. Scoring can be used as feedback to retrain the model and the trigger phrases.

Referring to FIG. 1, an overall architecture for the query processing system 100 is shown. The processing falls into three large groupings including training the neural network model 102 on the domain specific terminology, or jargon; creating the set of action-trigger phrases 104 for query processing; and processing user queries 106. A text selector 108 selects a minimal sample of sentences that captures the domain-specific terminology from a document corpus 110. The documents in the document corpus 110 might exist in any format such as .pdf, .doc, .xml or other formats. The present disclosure leverages the formalized writing style of the documentation and is agnostic to the container mechanism. The result is a set of sentences 112. The sentences 112 are fed into BERT 114 and SBERT 116 to produce a neural network 118 tailored to the terminology specific to the document corpus 110. The combination of the neural network model 102 and the action-trigger phrases 104 to produce a trained database 126, not only improves the accuracy of the search, but increases the overall speed and efficiency of the search and reduces the computational overhead of the overall query processing system 100.

An action trigger producer 120 takes documents from the document corpus 110 and, from each document, it selects action-trigger phrases that are potential matches for user queries, resulting in an action-trigger phrase set 122. This resulting set 122 is applied to the neural network 118 at 124 to create a trained database 126. The trained database 126 is trained on the domain-specific terminology and action triggers extracted from the document corpus 110. The query processing tool 128 takes a user query 130, vectorizes the query 130 using the neural network 118 and uses a cosine similarity approach to match against action-triggers in the trained database 126, producing a result report 132.

As an example, a user types a query for a topic, such as "set TPM keyword" at 128. The query processing tool 128 uses a set of action-trigger phrases that supports the neural network's query processing. The query processing tool 128 produces a result report 132. FIG. 2 is an example showing the top 10 results 200 in descending order of the cosine Confidence Score. By clicking on the "Details" button 202, the tool shows the sentence and paragraph context of an action-trigger phrase. If the user selects button 202, the tool shows the top 5 document contexts 300 for the action-trigger phrase as shown in FIG. 3.

Referring back to the text selector 108 of FIG. 1, creating a minimal set of sentences that encompass all of the document corpus unique terminology is important to decrease computational time, because BERT requires $n*(n-1)/2$ computations (where n is the number of sentences from the document corpus 110). The processing creates as output a collection of sentences to pass to BERT processing 114 called the CORPUS-SENTENCE set 112. The goal for populating the CORPUS-SENTENCE set 112 is to capture corpus-specific words and phrases (jargon) in context in a sentence. The processing creates intermediate structures including a CORPUS-TERM set containing the terms discovered in a glossary; a TOC-ENTRY set containing the table of contents entries, each classified as a major or minor heading; and an INDEX-ENTRY set containing the entries in the index, each classified as primary, secondary or tertiary, and the page or section reference for the index entry. These structural and content elements of a document provide the richest set of sentences containing domain-specific terms for training the neural network model 102. These include glossary entries and sentences from the document, index entries and their target sentences, formal tables with their description sentences and document text sentences immediately following major section headings.

Figure 4:
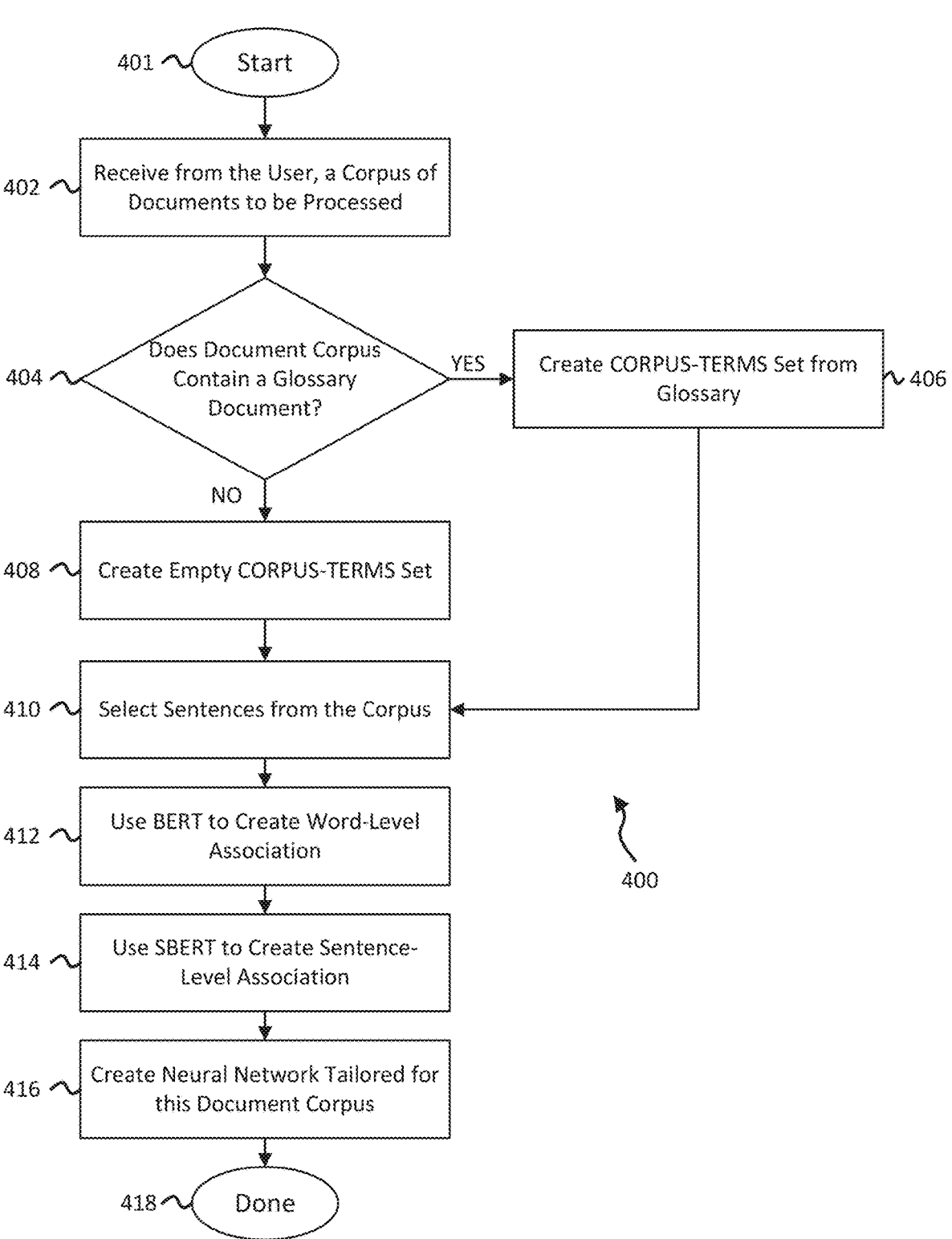
FIG. 4 is a flow diagram of the overall processing of the text selector of FIG. 1, according to one example embodiment of the present invention.

FIG. 4 is a flow diagram of the overall processing 400 of the text selector 108 by the processor. The process begins at start 401. At 402, a corpus of documents is received to be processed. In one test case, the document corpus contained 65,000 pages for formal end-user documentation plus 150,000 pages of technical documentation (architecture, design and training materials). Human intervention into the processing was impractical given the volume of information to be parsed. At 404, the processor determines if the document corpus contains a glossary document. If "YES" then at 406 a CORPUS-TERM set is created by the processor from the glossary. If "NO" then at 408 an empty CORPUS-TERM set is created by the processor. At 410, sentences are selected from the corpus. At 412, BERT is used by the processor to create word-level association. At 414, SBERT is used by the processor to create sentence level association. At 416, a neural network tailed for this document corpus is created and flow ends at 418.

Figure 5:
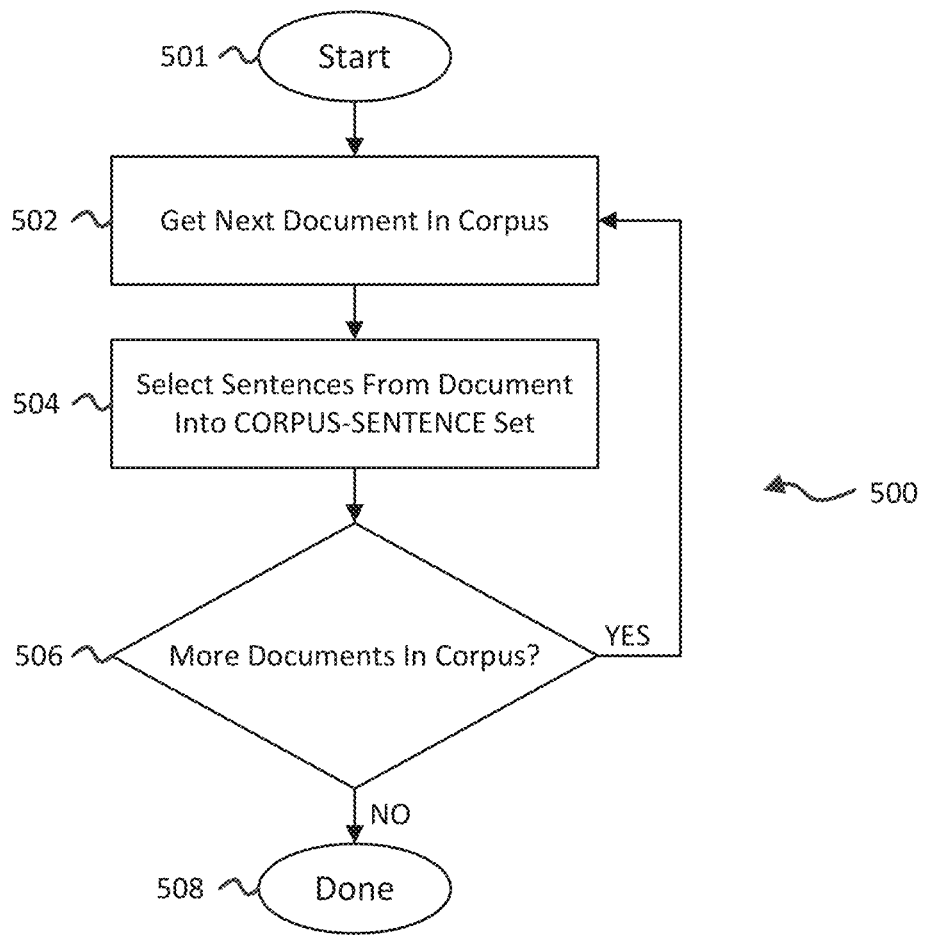
FIG. 5 is a more detailed flow diagram of the creation of the sentence set from FIG. 4, according to one example embodiment of the present invention.

FIG. 5 is a more detailed flow diagram of the creation 500 of the sentence set by the processor at 410 from FIG. 4. Flow starts at 501. At 502, a document is selected from the corpus. At 504, sentences are selected from the document and placed into the CORPUS-SENTENCE set by the processor. At 506, it is determined if there are more documents in the corpus. If "YES" the process repeats at 502. If "NO" then the process ends at 508.

Figure 6:
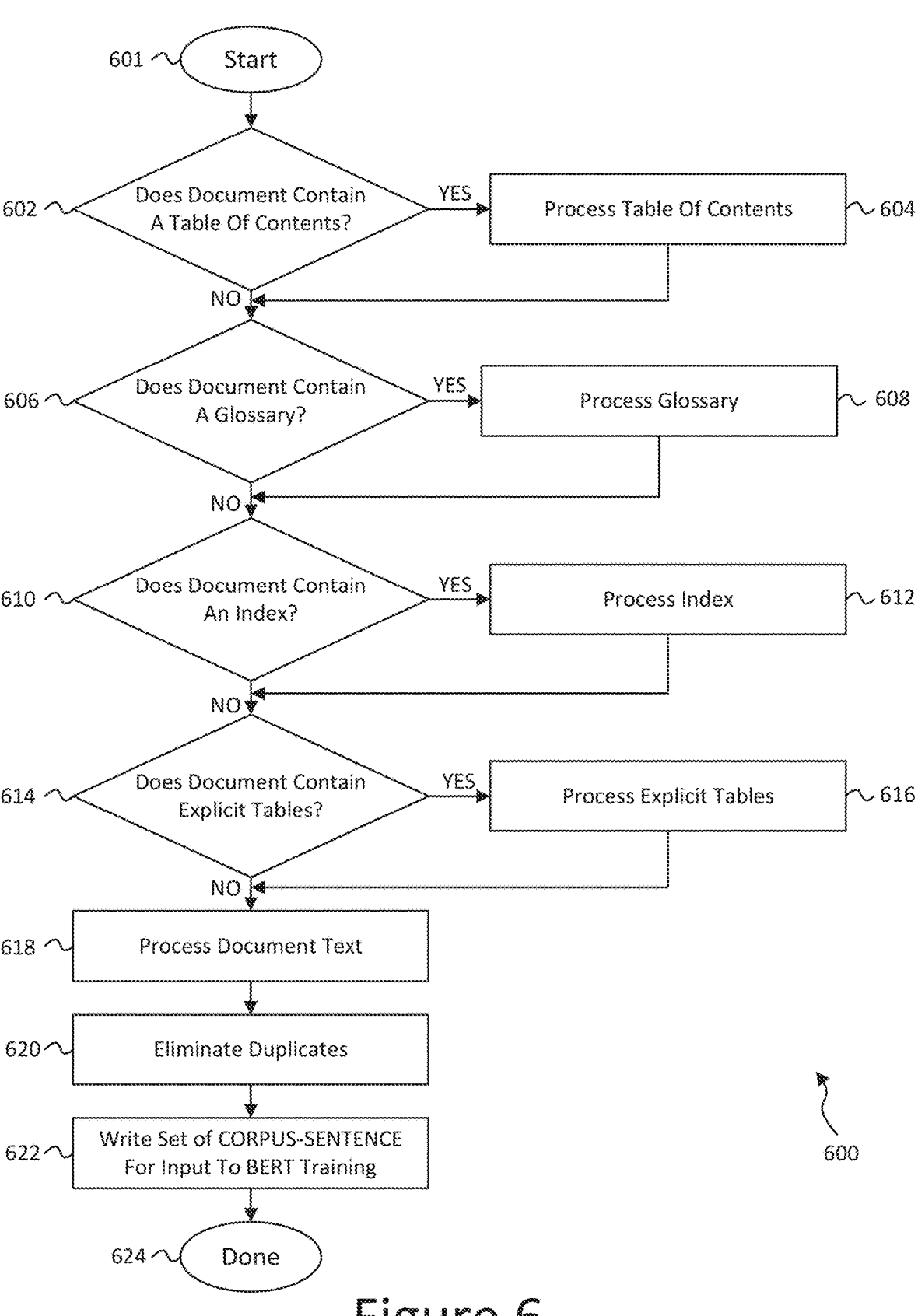
FIG. 6 is a more detailed flow diagram of the processing step of a portion of FIG. 5, according to one example embodiment of the present invention.

FIG. 6 is a more detailed flow diagram of the processing step of 504 of FIG. 5 by the processor. Processing begins at 601. At 602, it is determined by the processor if the document contains a table of contents. If "YES", then the table of contents is processed at 604. If "NO", it is determined by the processor if the document contains a glossary at 606. If "YES", then the glossary is processed at 608. If "NO", then it is determined by the processor if the document contains an index at 610. If "YES", the index is processed at 612. If "NO", it is determined by the processor if the document contains explicit tables at 614. If "YES", the explicit tables are processed at 616. If "NO", the document text is processed at 618. Because individual sentences may be selected multiple times using the table of contents, glossary and index structures, at 620, duplicates are eliminated by the processor. At 622, the CORPUS-SENTENCE set is written for input to the BERT and SBERT processing. Flow ends at 624.

Figure 7:
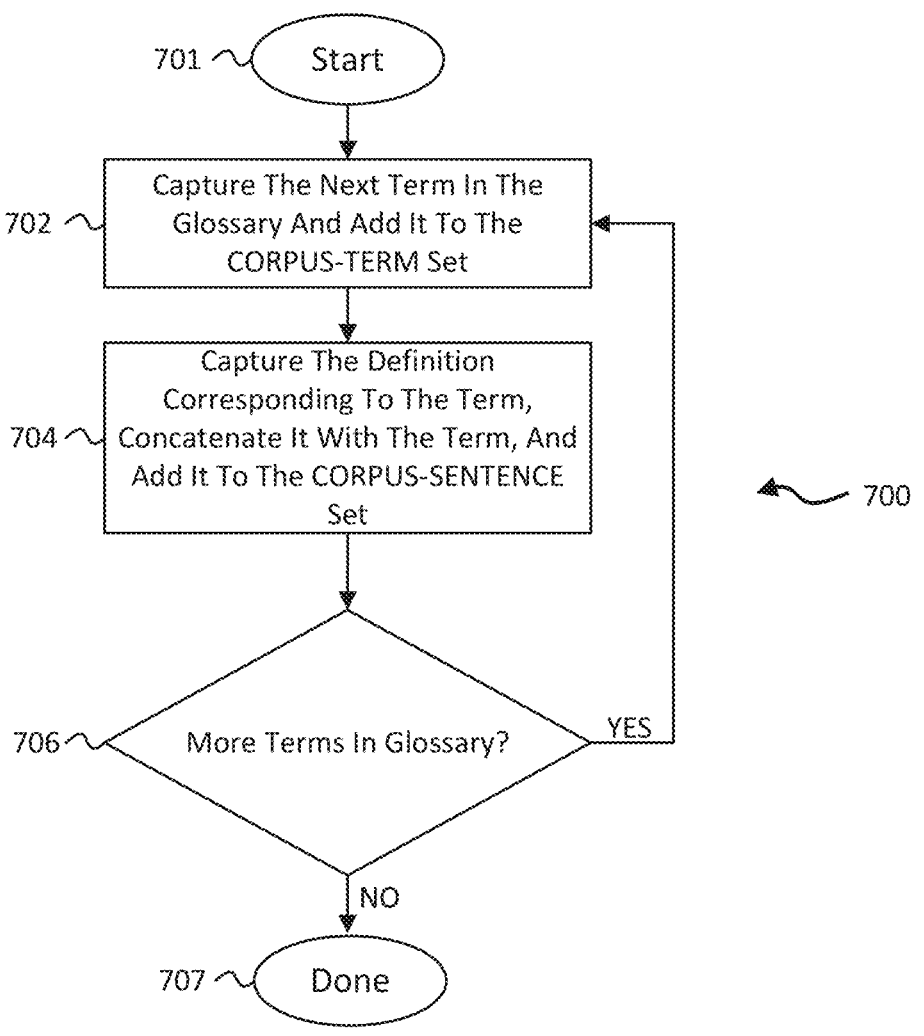
FIG. 7 is a more detailed flow diagram for processing the glossary, according to one example embodiment of the present invention.

FIG. 7 is a more detailed flow diagram for processing the glossary 700 by the processor. The flow begins at 701. At 702, the next term in the glossary is captured and added to the CORPUS-TERM set. At 704, the definition corresponding to the term is captured, concatenated with the definition into a single sentence, and the result added to the CORPUS-SENTENCE set by the processor. At 706, it is determined by the processor if more terms exist in the glossary. If "YES" then the process repeats at 702. If "NO" the process ends at 707.

Figure 8:
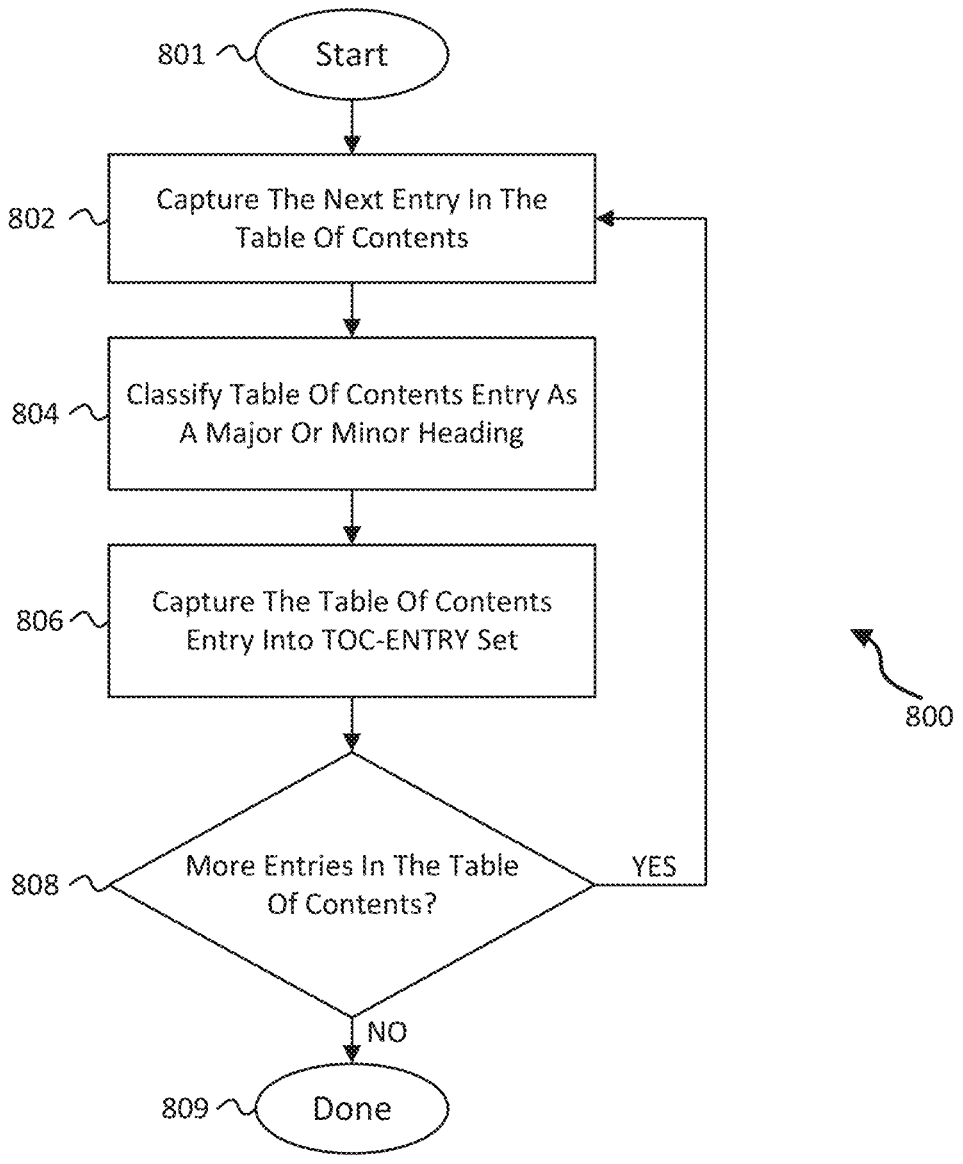
FIG. 8 is a more detailed flow diagram for processing the table of contents, according to one example embodiment of the present invention.

FIG. 8 is a more detailed flow diagram for processing the table of contents 800 by the processor. Flow begins at 801. At 802, the next entry in the table of contents is captured. At 804, the table of contents is classified at a major or minor heading. At 806, the table of contents entry is captured into the TOC-ENTRY set. At 808, it is determined by the processor if there are more entries in the table of contents. If "YES", then the process repeats at 802. If "NO" the process ends at 809.

Figure 9:
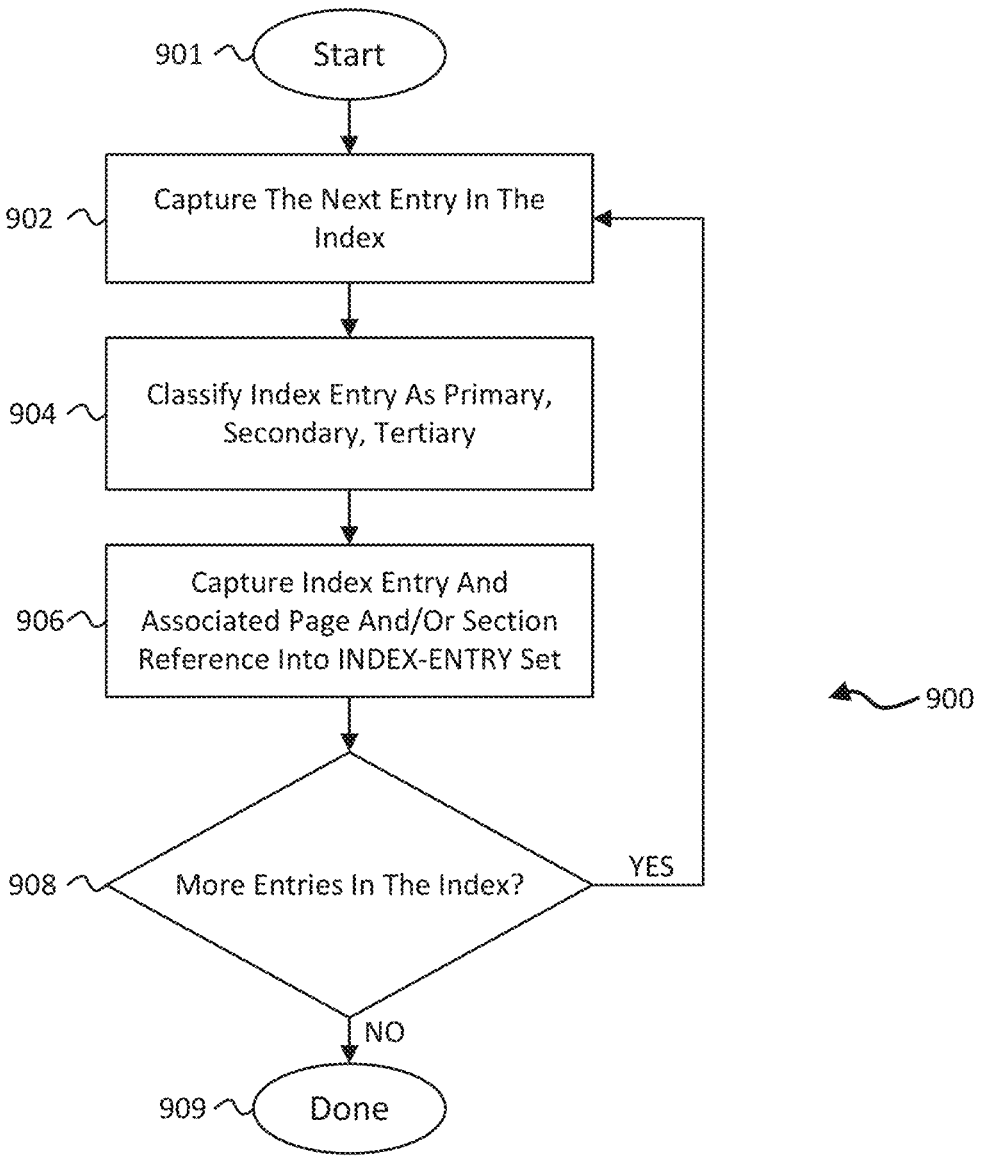
FIG. 9 is a more detailed flow diagram for processing indexes, according to one example embodiment of the present invention.

FIG. 9 is a more detailed flow for processing the index entries 900 by the processor. Flow begins at 901. At 902, the next entry in the index is captured. At 904, the entry is classified as primary, secondary, etc. At 906, the index entry and associated page and/or section reference is captured into INDEX-ENTRY set. At 908, it is determined if there are more entries in the index. If "YES", the process repeats itself at 902. If "NO", the flow ends at 909.

Figure 10:
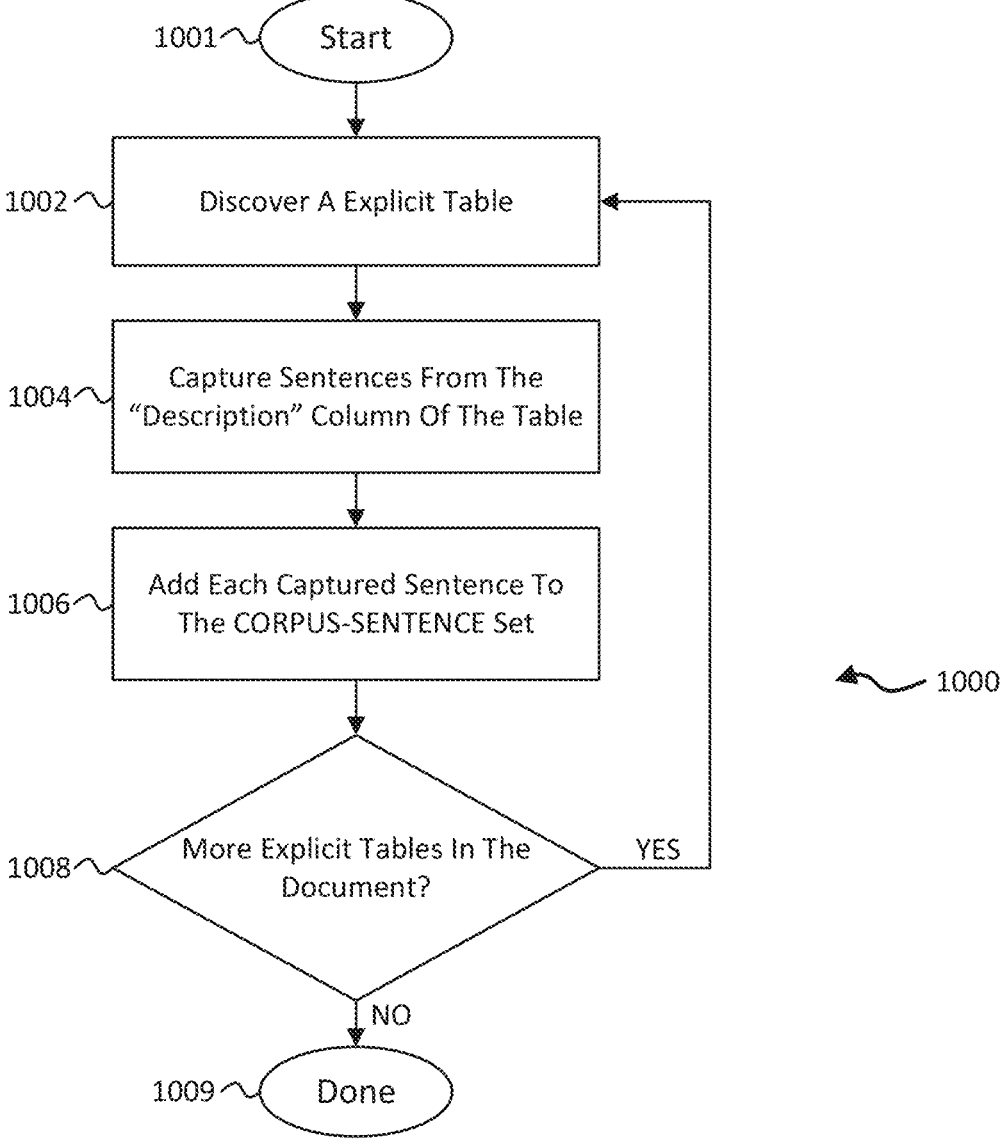
FIG. 10 is a more detailed flow diagram for processing tables, according to one example embodiment of the present invention.

FIG. 10 is a more detailed flow diagram for processing the formal tables 1000, or explicit tables, by the processor. Flow begins at 1001. At 1002, the explicit table is discovered. At 1004, sentences from the "Description" column of the table are captured. An NLP technique is used to determine which column contains description information. To determine which column is the description column, the processor applies pattern match and Natural Language Processing techniques. First, it looks for the keyword "Description" as a header label. Second, the SYNSET processing technique can be used to identify table header labels that belong to the same SYNSET as "Description". Third, it looks for sentence structure in the column values and leverages grammar to identify phrases and phrase patterns. It also checks to see if there is a column that contains a majority of phrases/phrase patterns. If so, the processor tentatively chooses it as the description column. Then, the processor analyzes the proportion of verbs across columns. If the column with the highest count of verbs matches the column containing the majority of phrases/phrase patterns, it asserts that column is the description column. If not, it asserts that the column with the highest count of verbs is the description column. At 1006, each captured sentence is added to the CORPUS-SENTENCE set. At 1008, it is determined by the processor if there are more tables in the document. If "YES" then the processing repeats at 1002. If "NO" then processing ends at 1009.

Figure 11:
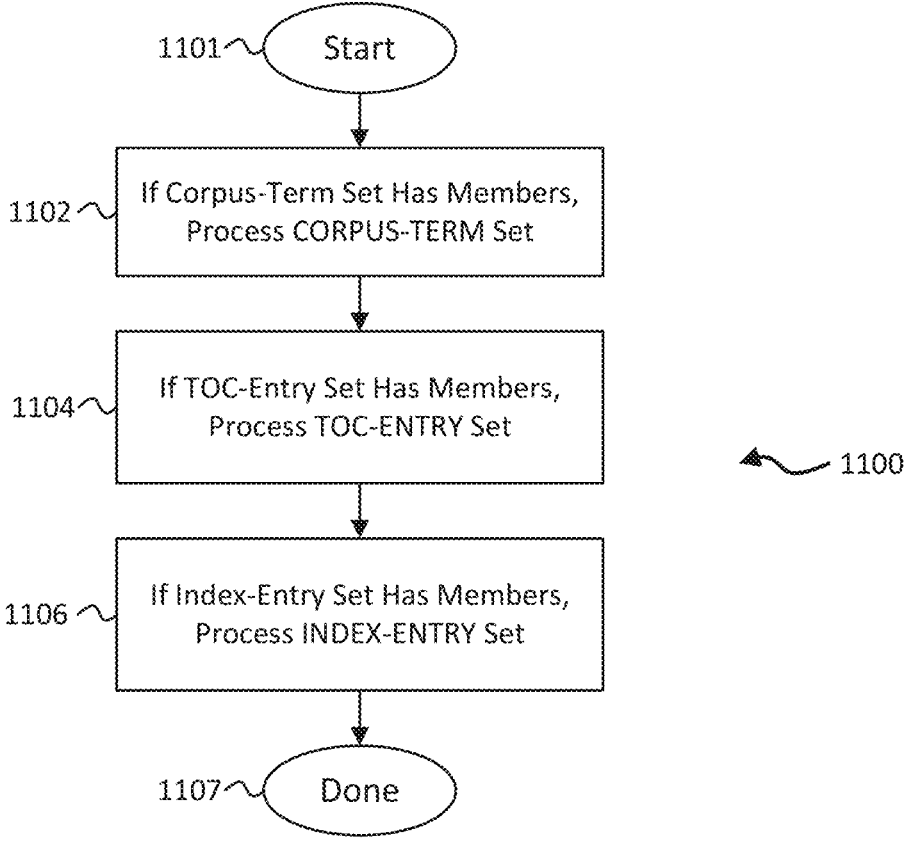
FIG. 11 is a flow diagram, according to one example embodiment of the present invention.

FIG. 11 is a more detailed flow diagram for processing 1100 of step 618 of FIG. 6 by the processor. Flow begins at 1101. At 1102, the CORPUS-TERM set is processed by the processor if it has members. At 1104, the TOC-ENTRY set is processed if it has members. At 1106, the INDEX-ENTRY set is processed if it has members.

Figure 12:
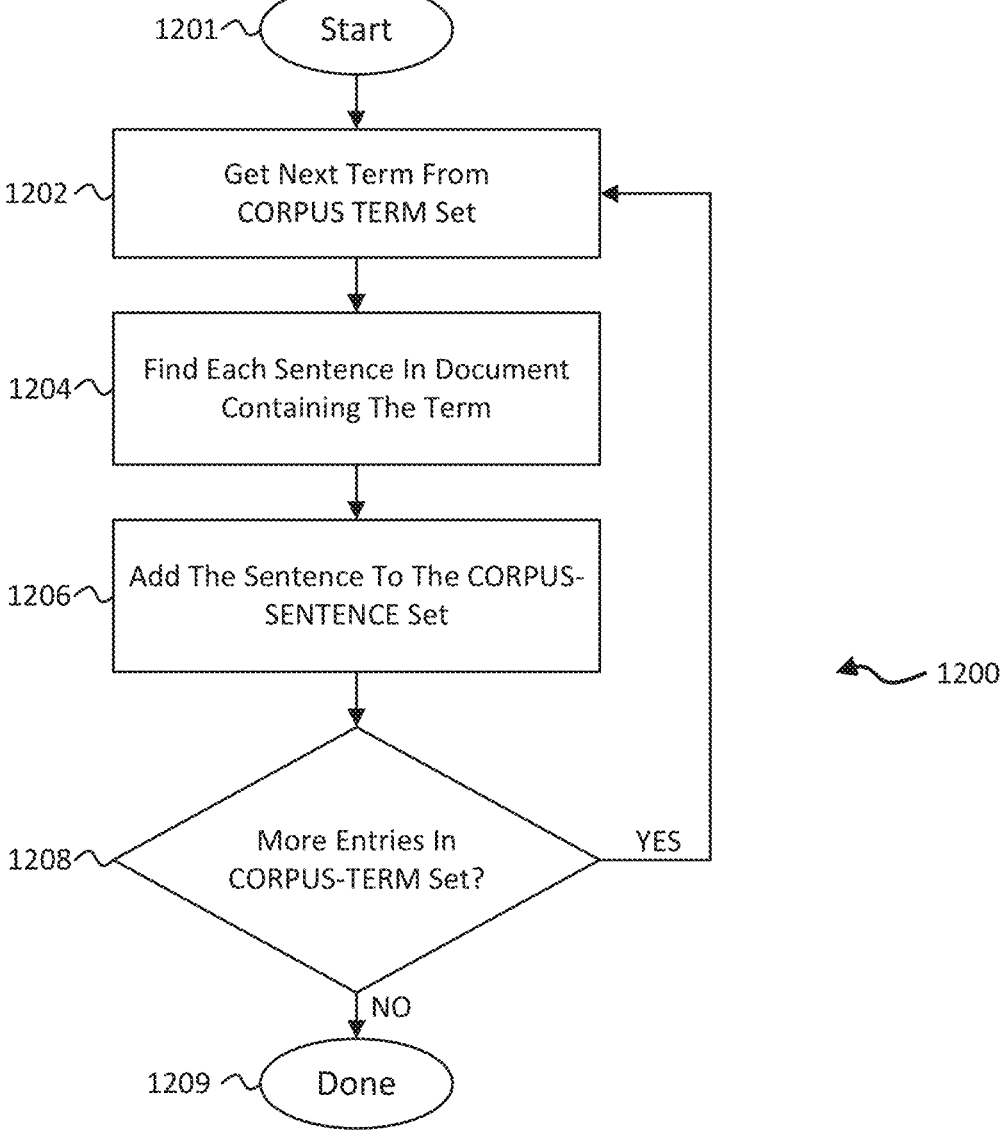
FIG. 12 is a flow diagram, according to one example embodiment of the present invention.

FIG. 12 is a more detailed flow diagram for processing 1200 step 1102 of FIG. 11. Flow begins at 1201. At 1202, the next term from the CORPUS-TERM set is found. At 1204, each sentence in the document that contains the term if found by the processor. At 1206, the sentences are added to the CORPUS-SENTENCE set. At 1208, it is determined if there are more entries in the CORPUS-TERM set. If "YES" the process repeats at 1202. If "NO" the process ends at 1209.

Figure 13:
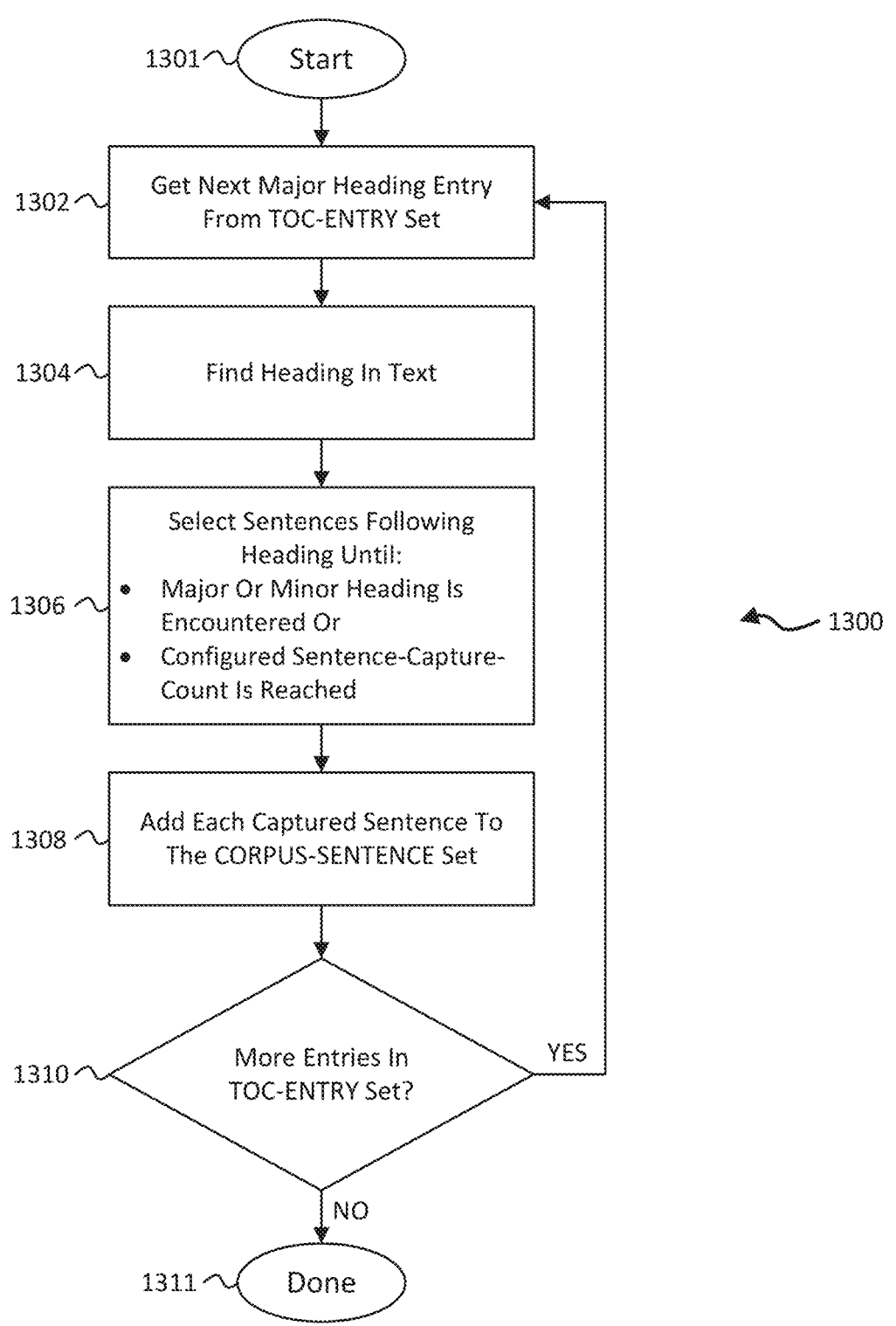
FIG. 13 is a flow diagram, according to one example embodiment of the present invention.

FIG. 13 is a more detailed flow diagram for processing 1300 step 1104 of FIG. 11. Flow beings at 1301. At 1302, the next major heading entry from the TOC-ENTRY set is found. At 1304, the heading is found in text. At 1306, sentences following the heading are selected until a major or minor heading is encountered or configured sentence-capture-count is reached. At 1308, each selected sentence is added to the CORPUS-SENTENCE set. At 1310, it is determined by the processor if there are more entries in the TOC-ENTRY set. If "YES" then the process repeats at 1302. If "NO" then the process ends at 1311.

Figure 14:
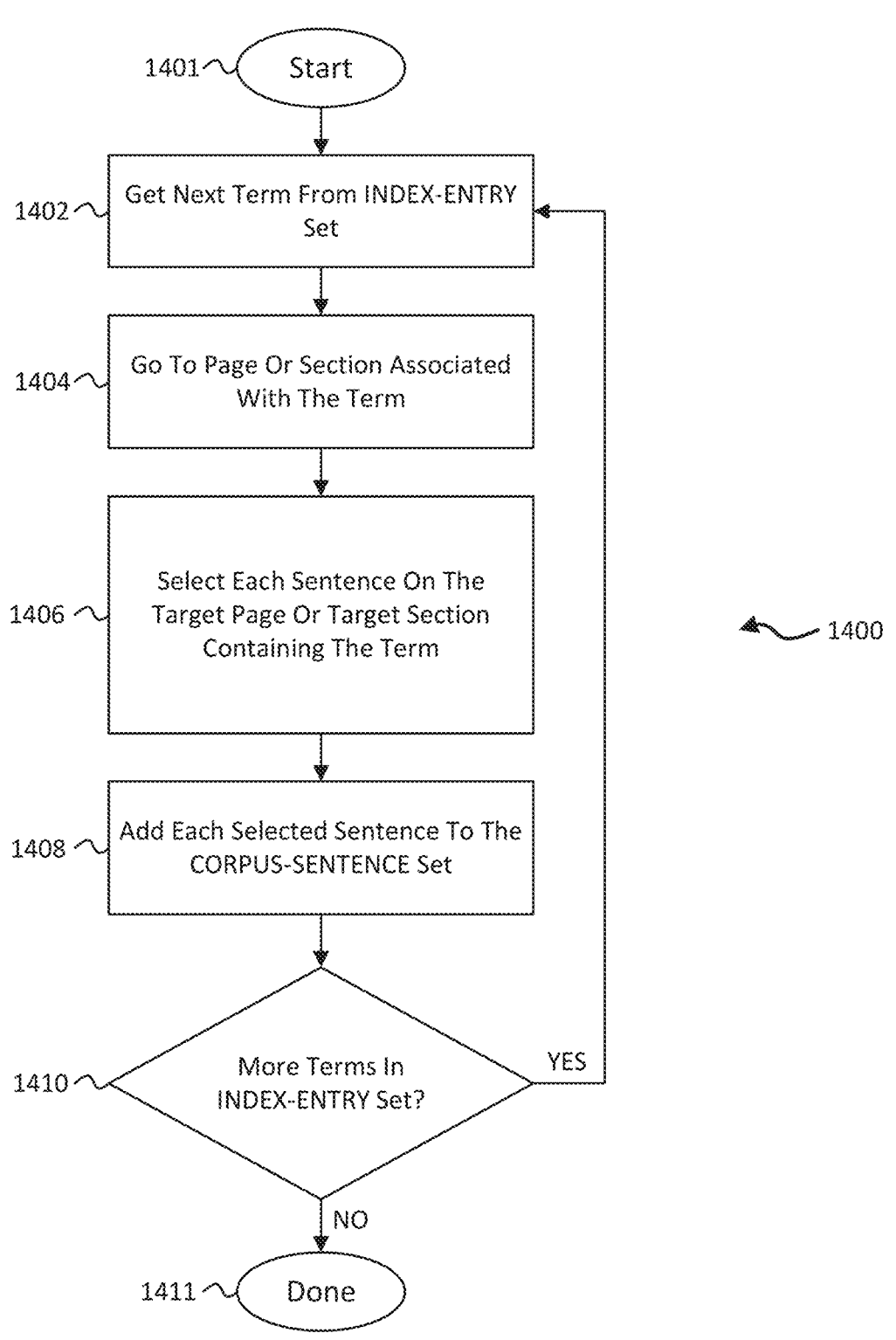
FIG. 14 is a flow diagram, according to one example embodiment of the present invention.

FIG. 14 is a more detailed flow diagram for processing 1400 step 1106 of FIG. 11. Flow begins at 1401. At 1402, the next term from the INDEX-ENTRY set is found. At 1404, the page or section associated with that term is found. At 1406, each sentence on the target page or target section containing the term is selected and at 1408 is added to the CORPUS-SENTENCE set. At 1410, it is determined by the processor if there are more terms in the INDEX-ENTRY set. If "YES", the process repeats at 1402. If "NO", the process ends at 1411.

Referring back to the action trigger producer 120 of FIG. 1, writers encode information into documents in a hierarchical manner, whose structure and implied semantic meaning is readily apparent to human readers of the document. Often this information is conveyed using conventions for highlighting (bold, italic, font change, etc.) and indenting. The structure, known by repetition, and the structure's implied semantic meaning is readily apparent to the human reader of the document. Identifying these structures algorithmically is a topic of the present disclosure. The processing creates as output a collection of action-trigger phrase sets in the system architecture of FIG. 1.

In one embodiment, these phrase sets, made up of comma-separated values, have this format: Action, Trigger, Document, Location. The Action is the potential user action or topic, discovered by query processing by the neural network match between the user query and the Trigger. The Trigger is the text against which the neural network compares the user query for a potential match. The Document identifies the document in the corpus. It can include a document title, document number, collection name, document location—for example, a SharePoint location, network file system folder, or corporate data base. Each embodiment and each corpus will have specific requirements for document identification. Hereinafter, this is referred to as <document_id>. The Location identifies the location of the Action in the document. It can include a section name and number, table name and number, figure name and number, page number, hyperlink, referenced file and so on. Each embodiment and each corpus will have specific requirements for Action location. Hereinafter, this is referred to as <location>.

FIG. 15 is a flow diagram illustrating the overall processing 1500 for the action-trigger producer 120 of FIG. 1 by the processor. Flow begins at 1501. At 1502, a corpus of documents to be processed is received. At 1504, it is determined by the processor if the document corpus contains a glossary. If "YES" then a CORPUS-TERM set is created from the glossary at 1506. If "NO", an empty CORPUS-TERM set is created at 1508. At 1510, ACTION-TRIGGER PHRASE sets are generated from the corpus. At 1512, the neural network tailored for this document corpus is found. At 1514, the neural network is applied to the ACTION-TRIGGER PHRASE sets. At 1516, a resulting trained database tailored for this document corpus is created. Flow ends at 1517. Applying the neural network to the ACTION-TRIGGER PHRASE sets to create a trained database improves search time and efficiency and reduces the computational power necessary to search in response to a user query. It also improves the accuracy of the results of the search.

Figure 16:
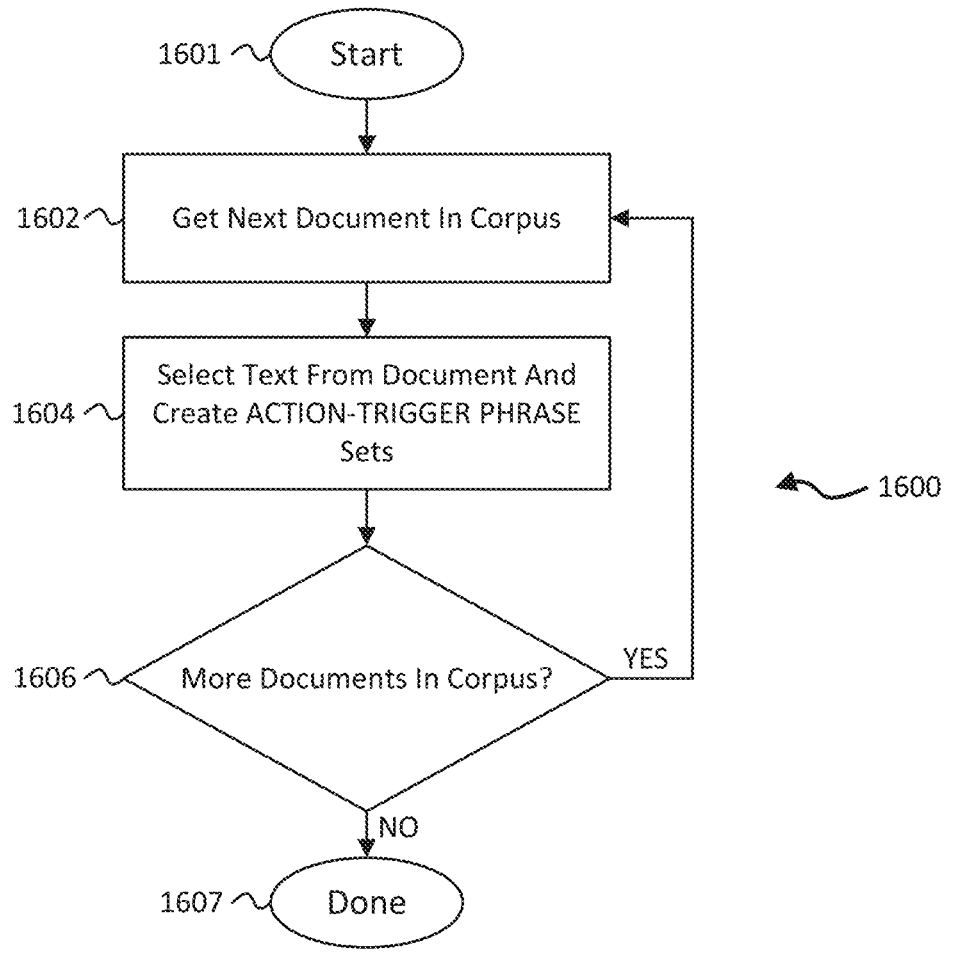
FIG. 16 is a flow diagram, according to one example embodiment of the present invention.

FIG. 16 is a more detailed flow diagram of the processing 1600 for step 1510 of FIG. 15 by the processor. Flow begins at 1601. At 1602, the next document in the corpus is found. At 1604, text is selected from the document and ACTION-TRIGGER PHRASE sets are created. At 1606, it is determined if more documents exist in the corpus. If "YES", the process repeats at 1602. If "NO", flow ends at 1607.

Figure 17:
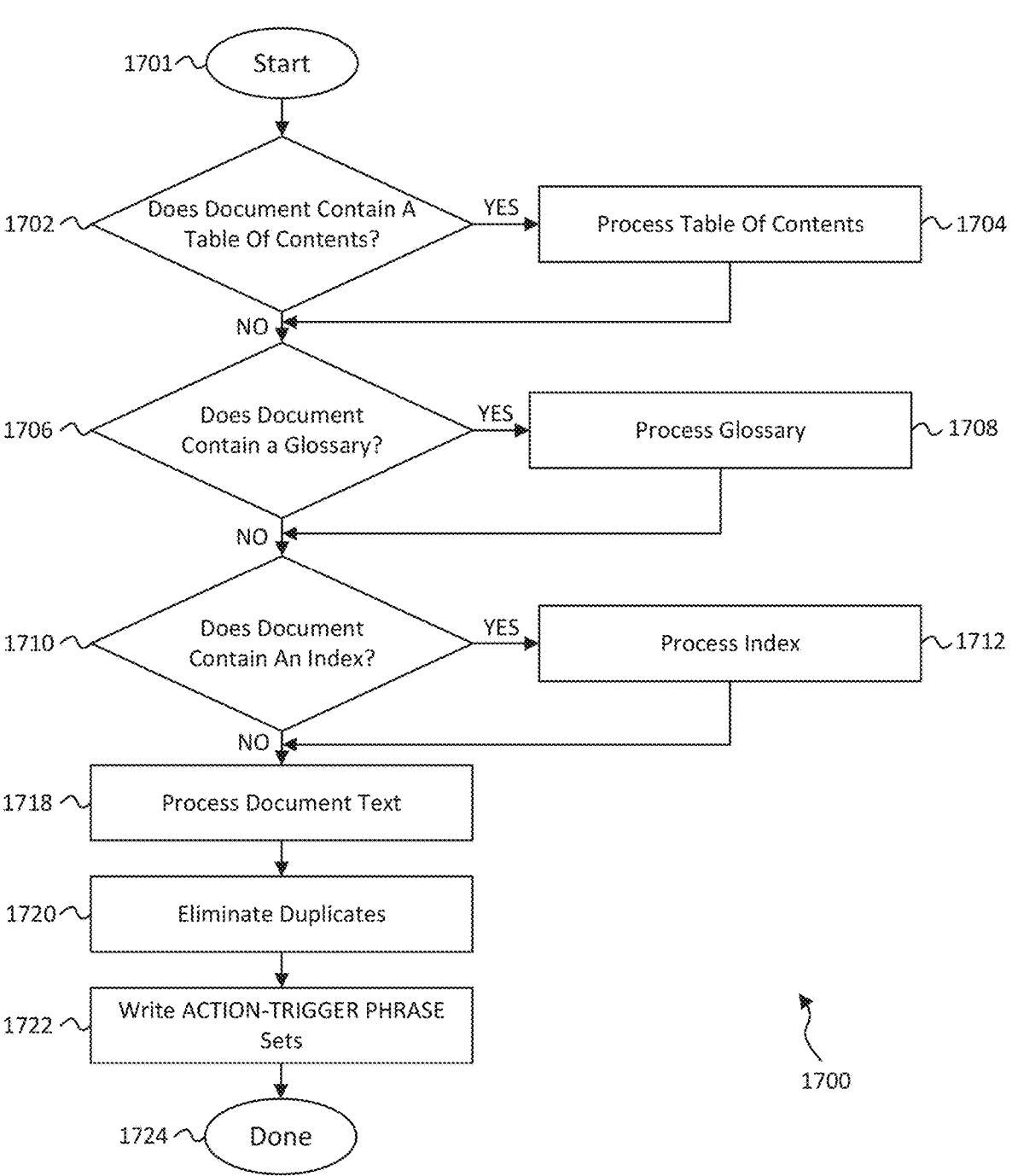
FIG. 17 is a flow diagram, according to one example embodiment of the present invention.

FIG. 17 is a more detailed flow diagram of the processing of step 1604 from FIG. 16 by the processor. Flow begins at 1701. At 1702, it is determined by the processor if the document contains a table of contents. If "YES", then the table of contents is processed at 1704. If "NO", it is determined by the processor if the document contains a glossary at 1706. If "YES", then the glossary is processed at 1708. If "NO", then it is determined by the processor if the document contains an index at 1710. If "YES", the index is processed at 1712. If "NO", the document text is processed at 1718. Because individual sentences may be selected multiple times using the table of contents, glossary and index structures, at 1720, duplicates are eliminated by the processor. At 1722, the ACTION-TRIGGER PHRASE sets are written. Flow ends at 1724.

Figure 18:
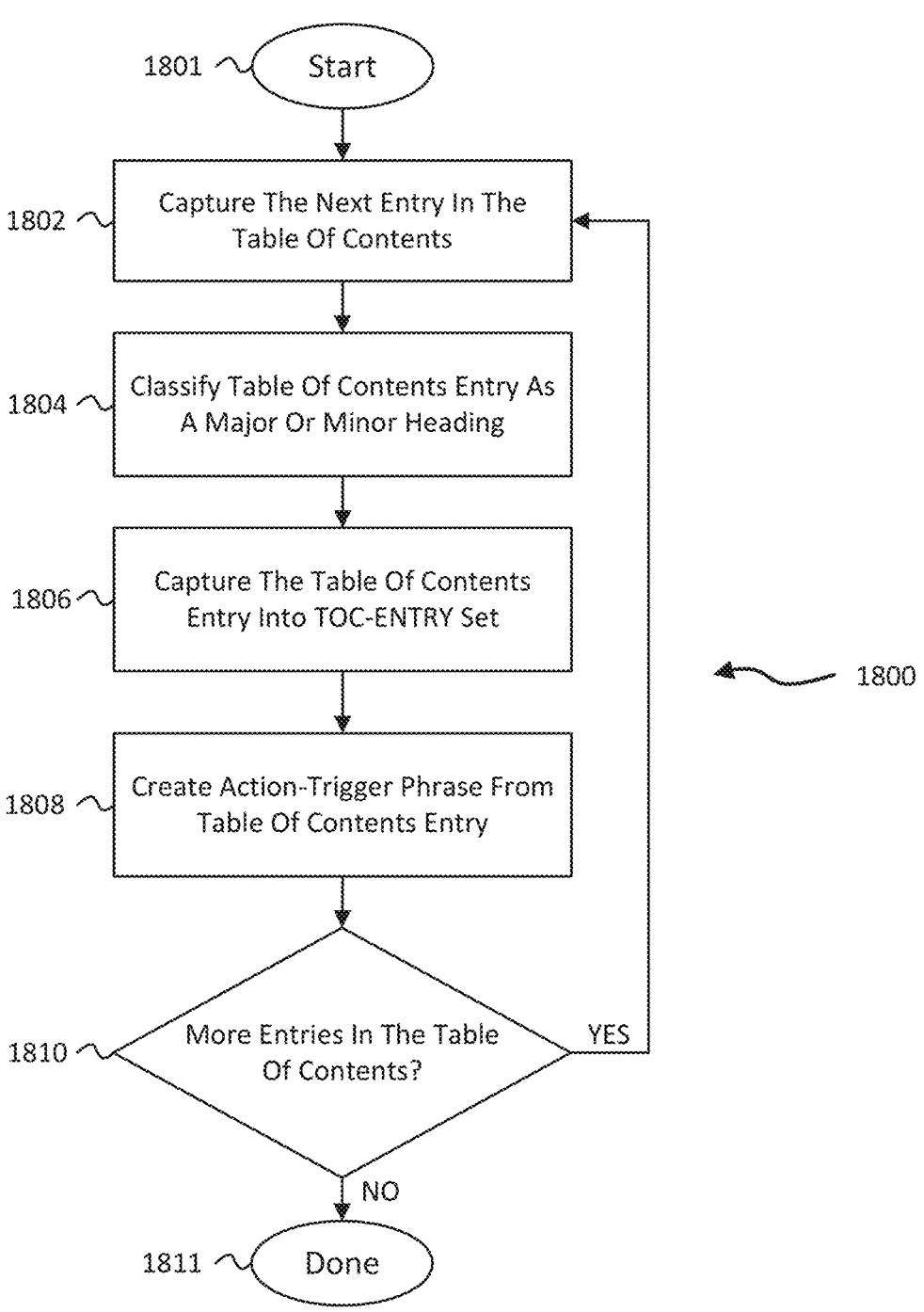
FIG. 18 is a flow diagram, according to one example embodiment of the present invention.
Figure 19:
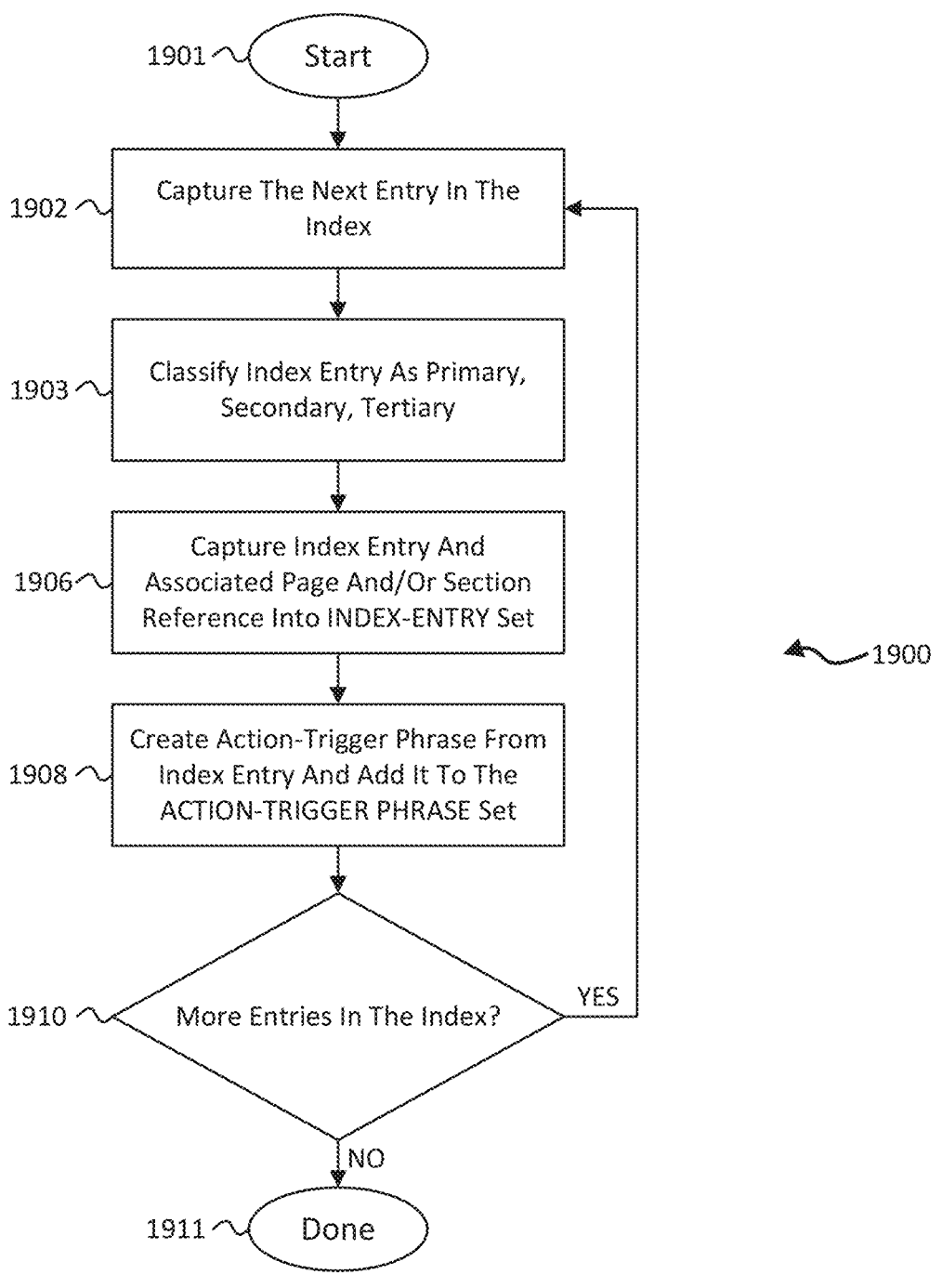
FIG. 19 is a flow diagram, according to one example embodiment of the present invention.

Referring back to FIG. 7, the same flow process can be used for adding to the ACTION-TRIGGER PHRASE sets. Referring to FIG. 18, the processing is similar to that of FIG. 8, except that at 1808, an action-trigger phrase from the table of contents entry is created. Referring to FIG. 19, the processing is similar to that of FIG. 9, except that at 1908, an action-trigger phrase from the index entry is added to the ACTION-TRIGGER PHRASE set.

Figure 20:
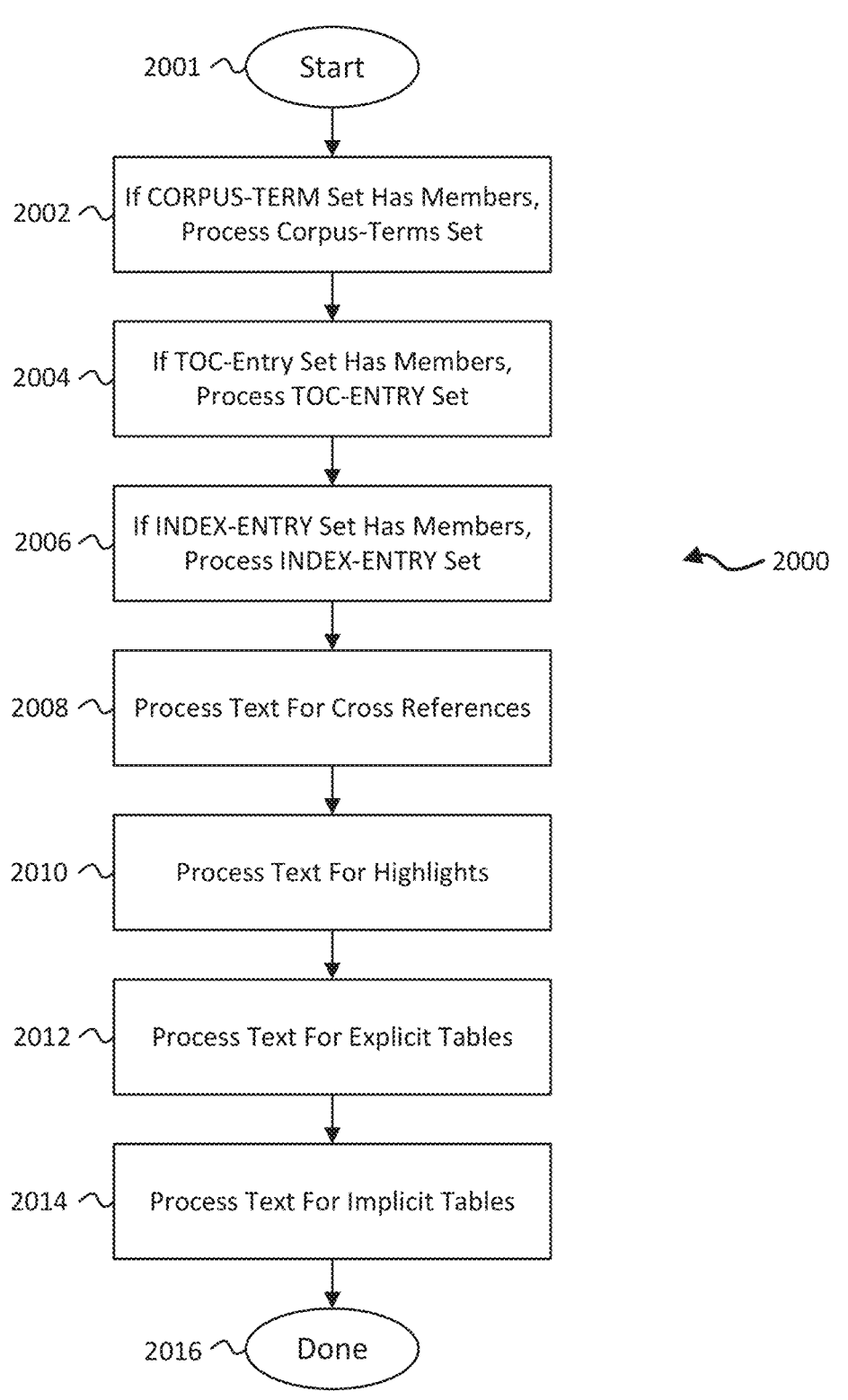
FIG. 20 is a flow diagram, according to one example embodiment of the present invention.

FIG. 20 is a more detailed flow diagram of the processing of step 1722 of FIG. 17 by the processor. Flow begins at 2001. At 2002, if the CORPUS-TERM set has members, it is processed by the processor. At 2004, if the TOC-ENTRY set has members, it is processed by the processor. At 2006, if the INDEX-ENTRY set has members, it is processed by the processor. The remaining processing goes through all the sections in the document to search for additional formal structures from which semantic information can be captured automatically. At 2008, the text is processed for cross references by the processor. Sections, paragraphs and sentences with more cross references are more interesting from a semantic value standpoint. At 2010, the text is processed for highlights. This includes font changes, bolding, italicization, pop ups and so on. At 2012, the text is processed for explicit tables. At 2014, the text is processed for implicit tables. (See FIG. 27 below for implicit table discussion.) Flow ends at 2016.

Figure 21:
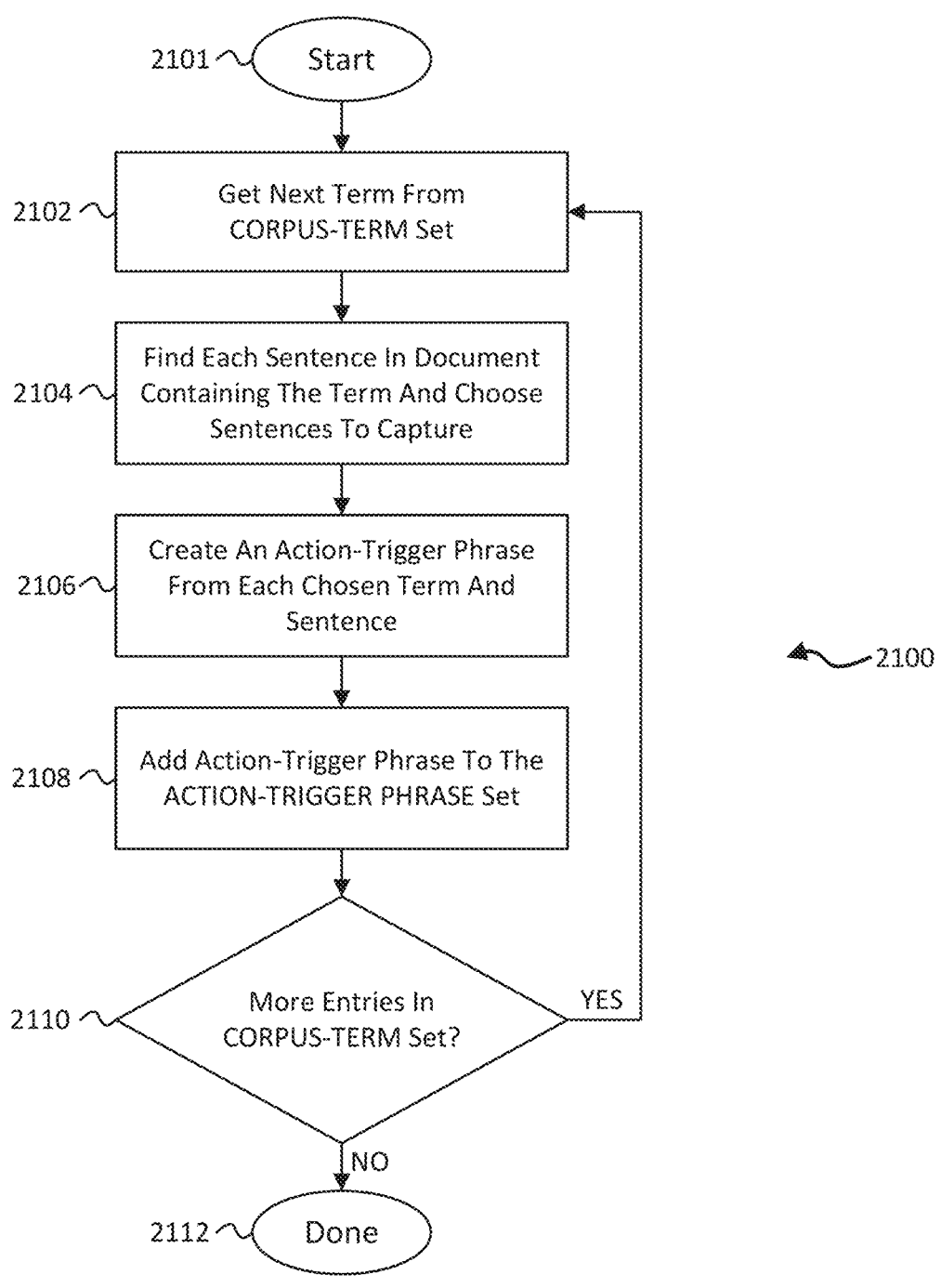
FIG. 21 is a flow diagram, according to one example embodiment of the present invention.

FIG. 21 is a more detailed flow diagram of the processing 2100 for step 2002 of FIG. 20 by the processor. Flow beings at 2101. At 2102, the next term from the CORPUS-TERM set is found. At 2104, each sentence in the document containing the term is found and sentences are chosen to be captured. From the discovered sentences, the processor chooses sentences that meet all of these criteria: 1) does the term appear in the first half of the sentence; 2) does the sentence appear in the first half of the paragraph; 3) does the term appear in more than one sentence in the section; and 4) does the sentence appear in prose text, not in a formal table or implicit table. At 2106, an action-trigger phrase is created from each chosen term and sentence. At 2108, the action-trigger phrase is added to the ACTION-TRIGGER PHRASE set. At 2110, it is determined by the processor if there are more entries in the CORPUS-TERM set. If "YES", then the process repeats at 2102. If "NO" then flow ends at 2112.

Figure 22:
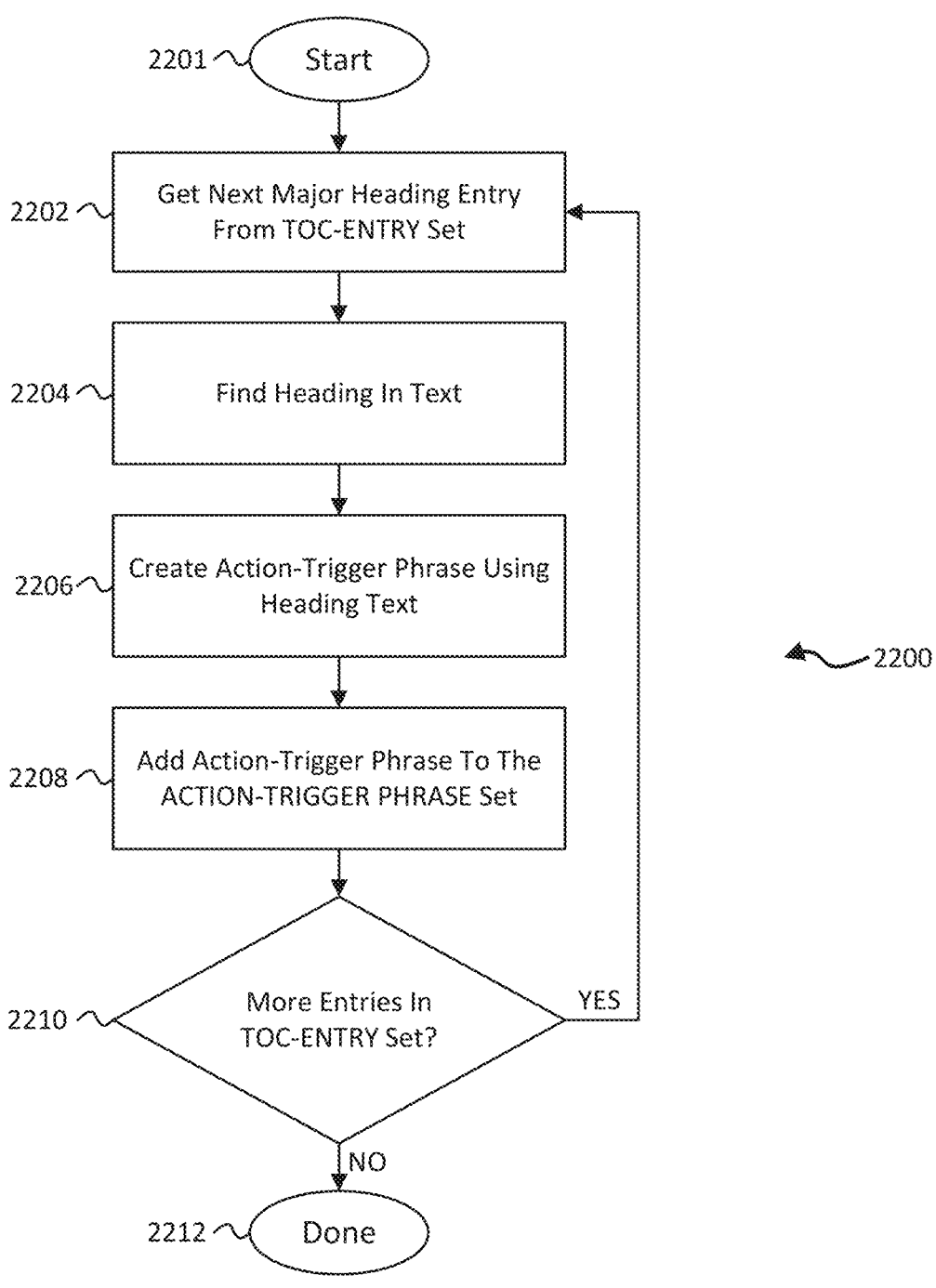
FIG. 22 is a flow diagram, according to one example embodiment of the present invention.

FIG. 22 is a more detailed flow of the processing 2200 for step 2004 of FIG. 20 by the processor. Flow begins at 2201. At 2202, the next major heading entry from the TOC-ENTRY set is found. At 2204, headings in the text are found. At 2206, an action-trigger phrase is created using the heading text. The processing recognizes several possible information formats that may follow the heading, including indentation and spacing pattern, "format" and "purpose" keywords and their SYNSET equivalents and "format" and "purpose" words and their SYNSET equivalents appearing in sentences. At 2208, the action-trigger phrase is added to the ACTION-TRIGGER PHRASE set. At 2210, it is determined if there are more entries in the TOC-ENTRY set. If "Yes", the process repeats at 2202. If "NO", flow ends at 2212.

Figure 23:
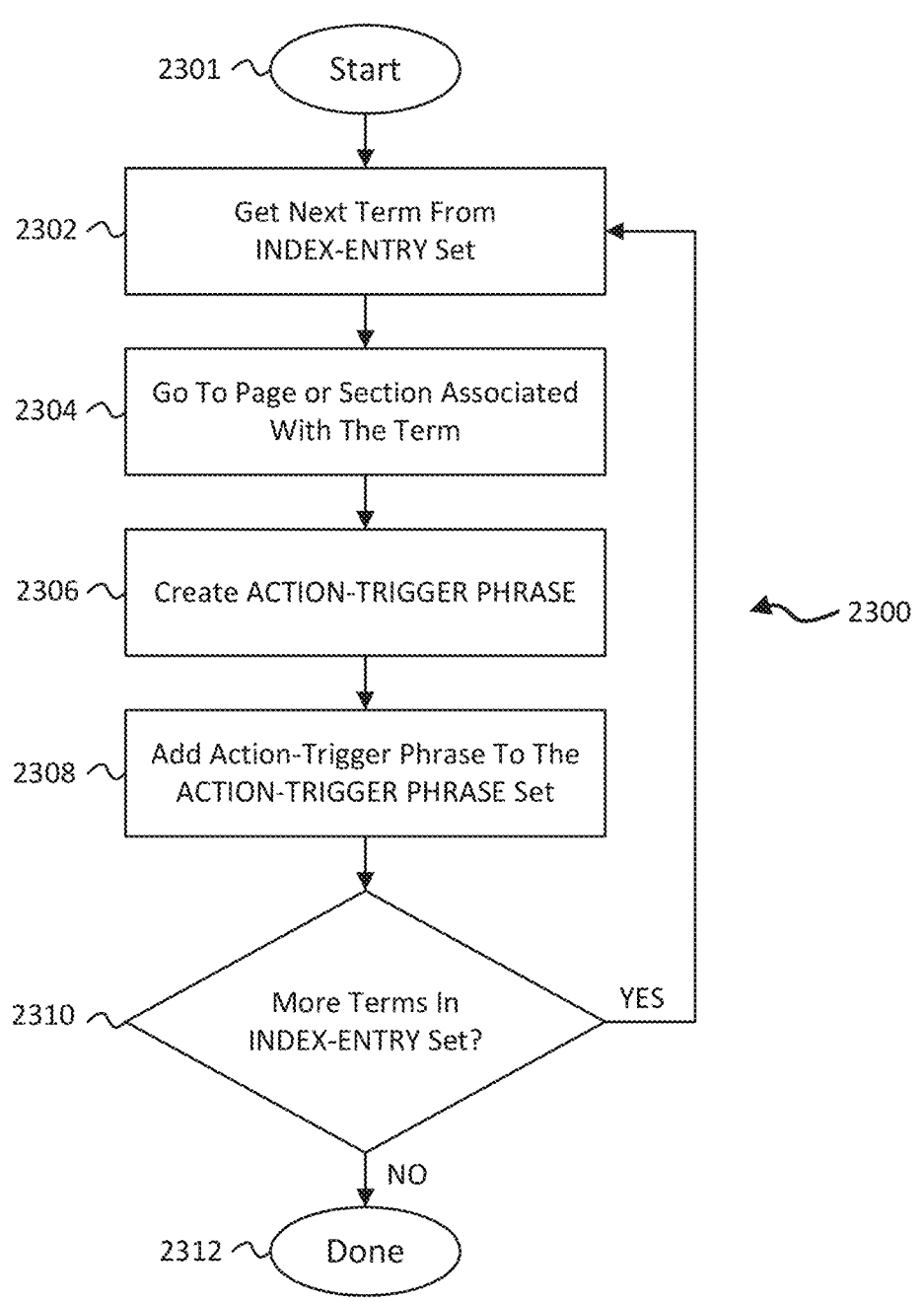
FIG. 23 is a flow diagram, according to one example embodiment of the present invention.

FIG. 23 is a more detailed flow diagram of the processing 2300 for step 2006 of FIG. 20 by the processor. Flow begins at 2301. At 2302, the next term from the INDEX-ENTRY set is found. At 2304, the page or section associated with the term is found. Within that section, the processor captures each unique sentence that contains the index term and creates an action-trigger phrase at 2306. At 2308, the action-trigger phrase is added to the ACTION-TRIGGER PHRASE set. At 2310, it is determined if more terms are in the INDEX-ENTRY set. If "YES", the process repeats at 2302. If "NO", the process ends at 2312.

Figure 24:
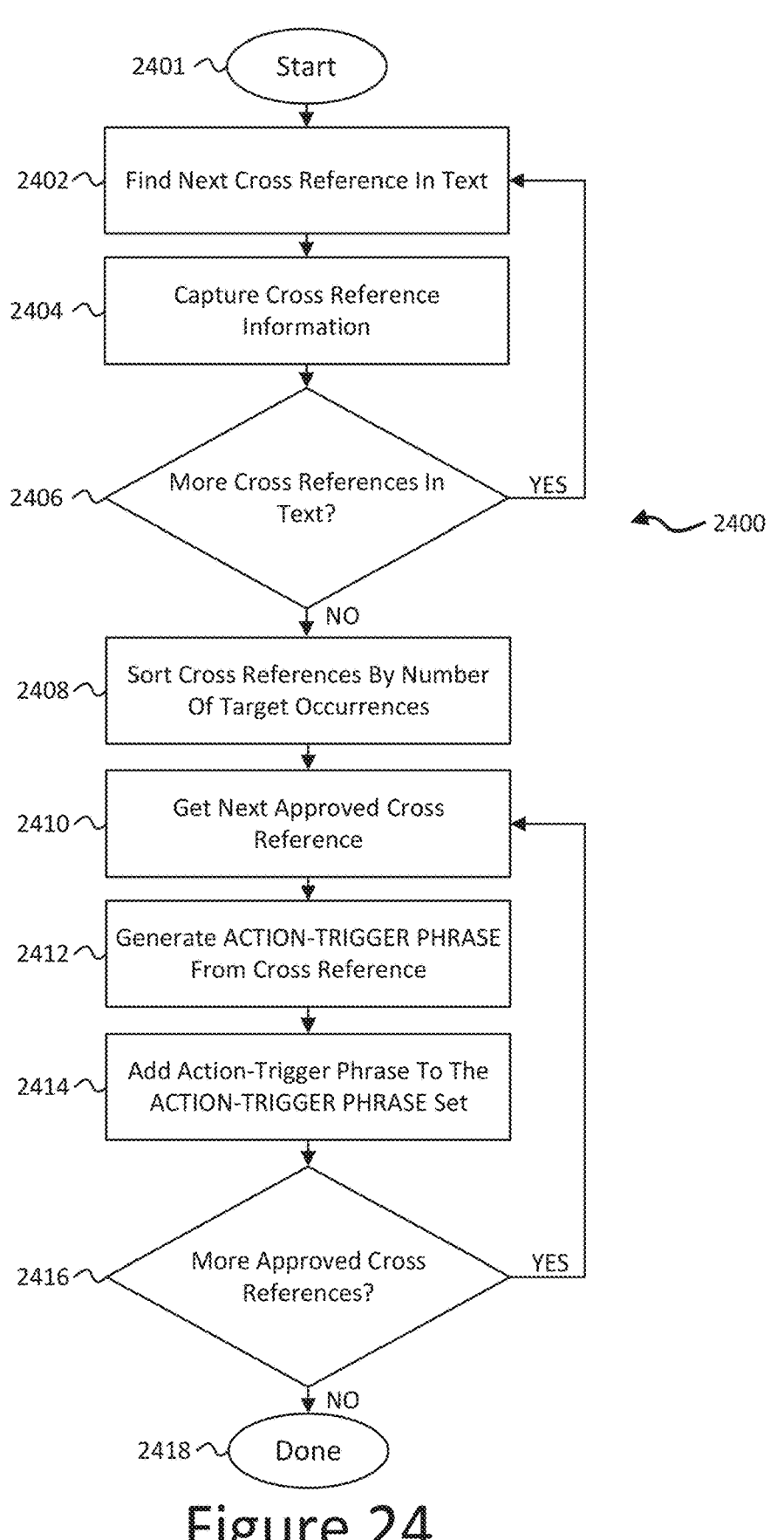
FIG. 24 is a flow diagram, according to one example embodiment of the present invention.

FIG. 24 is a more detailed flow diagram of the processing 2400 for step 2008 of FIG. 20 by the processor. Flow begins at 2401. At 2402, the next cross reference in the text is found. Each cross reference provides valuable semantic information about the importance of target sections in the document. To determine which text is a cross reference, the processor applies pattern match and Natural Language Processing techniques. At 2404 the cross reference information is captured. At 2406, it is determined by the processor if more cross references are in the text. If "YES", flow branches to 2402. If "NO" the cross references are sorted by number of target occurrences at 2408. At 2410, the next approved cross reference is found. At 2412, an action-trigger phrase is generated, and at 2414, it is added to the ACTION-TRIGGER PHRASE set. At 2416, it is determined by the processor if there are more approved cross references. If "YES" flow branches to 2410. If "NO" flow ends at 2418.

Figure 25:
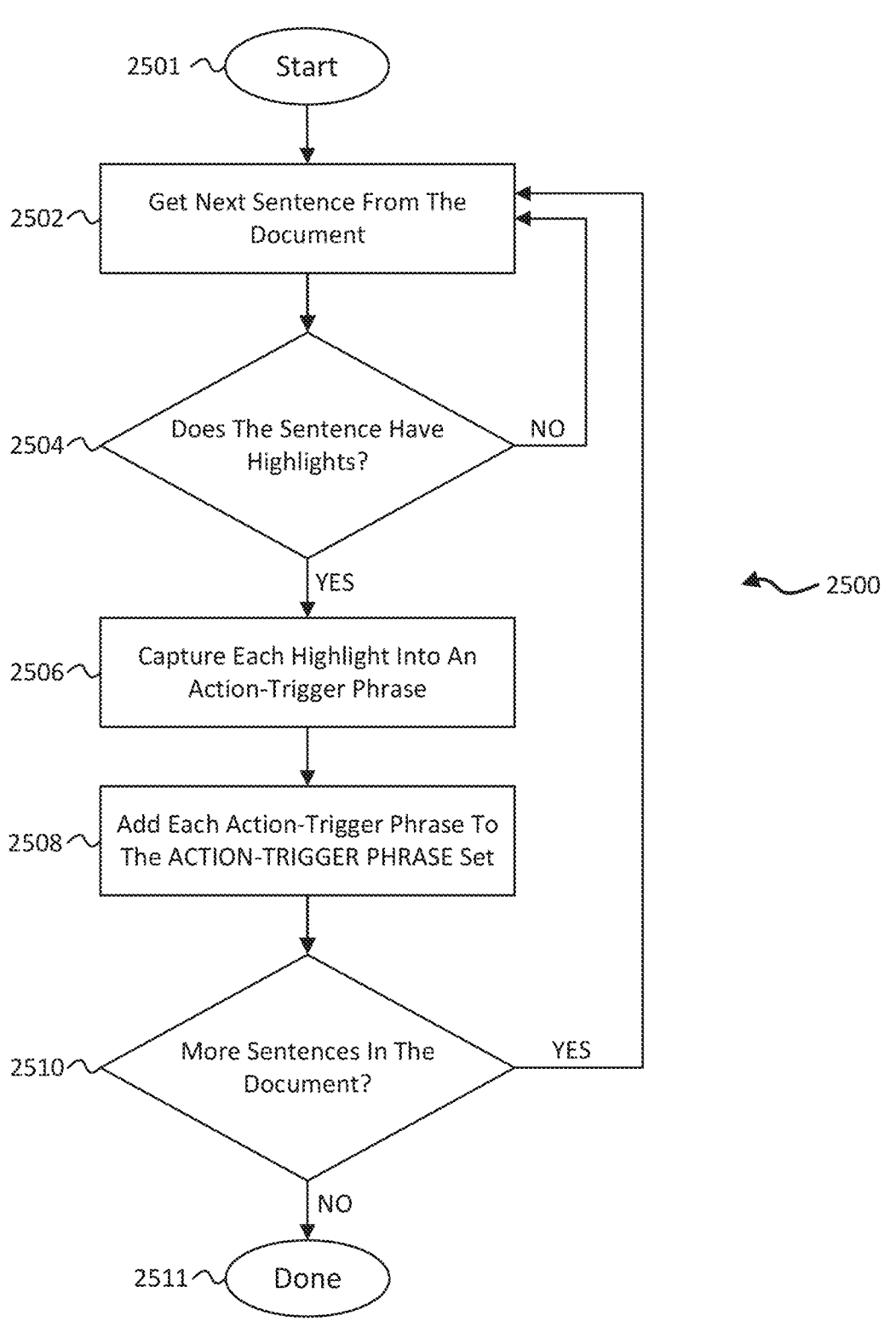
FIG. 25 is a flow diagram, according to one example embodiment of the present invention.

FIG. 25 is a more detailed flow diagram of the processing 2500 for step 2010 of FIG. 20 by the processor. Flow begins at 2501. At 2502, the next sentence from the document is found. At 2504, it is determined if the sentence has highlights. Highlights can include a change in font name, font size, from non-bold to bold or from non-italic to italic. Highlights can also include the whole sentence is italic or bold and the sentence contains a pop-up or hyper link. If "NO", flow branches to 2502. If "YES", at 2506 each highlight is captured into an action-trigger phrase and at 2508, and it is added to the ACTION-TRIGGER PHRASE set. At 2510, it is determined if there are more sentences in the document. If "YES", flow branches to 2502. If "NO", flow ends at 2511.

Figure 26:
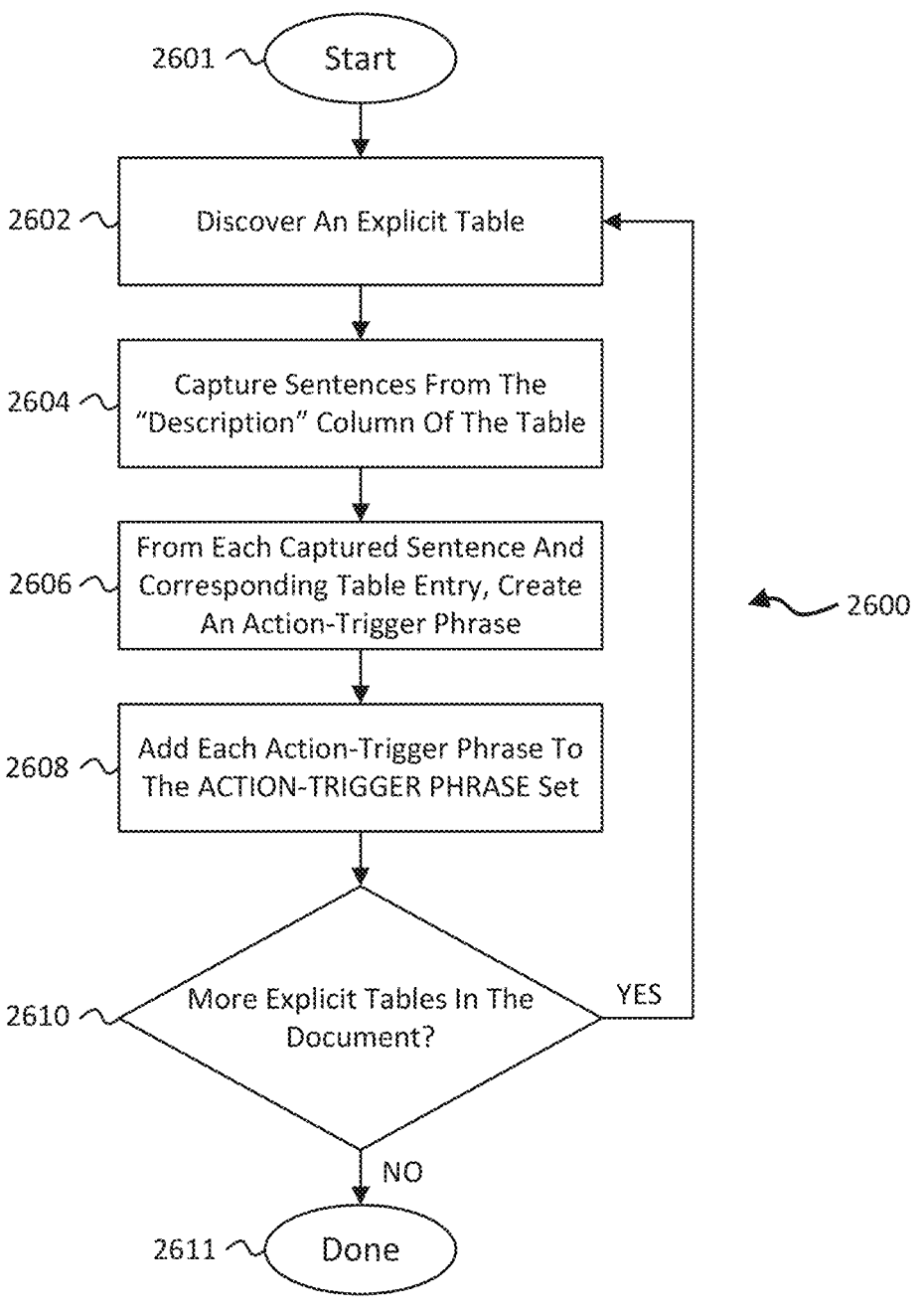
FIG. 26 is a flow diagram, according to one example embodiment of the present invention.

FIG. 26 is a more detailed flow diagram of the processing for explicit tables 2600, for step 2012 of FIG. 20, by the processor. Flow begins at 2601. At 2602, an explicit table is discovered. At 2604, sentences from the "description" column of the table are captured. At 2606, from each captured sentence and corresponding table, an action-trigger phrase is created, and at 2608 it is added to the ACTION-TRIGGER PHRASE set. At 2610 the processor determines if there are more explicit tables in the document. If "YES" the process repeats at 2602. If "NO", the flow ends at 2611.

Implicit tables are an important part of the semantic information in a technical document. Implicit tables are not called out as a table but are an assumption to a structure of semantic information in a document and follow a pattern of indenting, tabbing or spacing that set apart information from the rest of the text. As an example, there may be an indention to a first descriptive phrase and a second indention to a second descriptive phrase:

| | |
|---|---|
| DPSIF | The File Initialization Processor initializes DPS 200 system files. |
| DPSPW | The processor generates information about authorized users. |

The first descriptive phrase would be the action and the second descriptive phrase would be the trigger. The second descriptive phrase may appear on the same line as the first descriptive phrase or may appear on a next line. The implicit table could also be set apart by bold or unbold text:

Bits 0-5 Short_Status_Field (SSF)
Contains interrupt status when found in an Interrupt_Control_Stack frame
Bits 6-8 Mid-Instruction-Description (MID) Flags
See 5.1.3 for a complete description of these bits.
Bit 6 Instruction in F0 (INF)
See 2.2.5 for a description of Instruction in F0.
As another example, bulleted paragraphs versus non-bulleted paragraphs. The key is in looking for repetition or a pattern in the formatting of text to find implicit tables having a first descriptive phrase as the action and a second descriptive phrase as the trigger. Implicit tables can be nested within implicit or explicit tables. Explicit tables can be nested within implicit or explicit tables as well.

Figure 27:
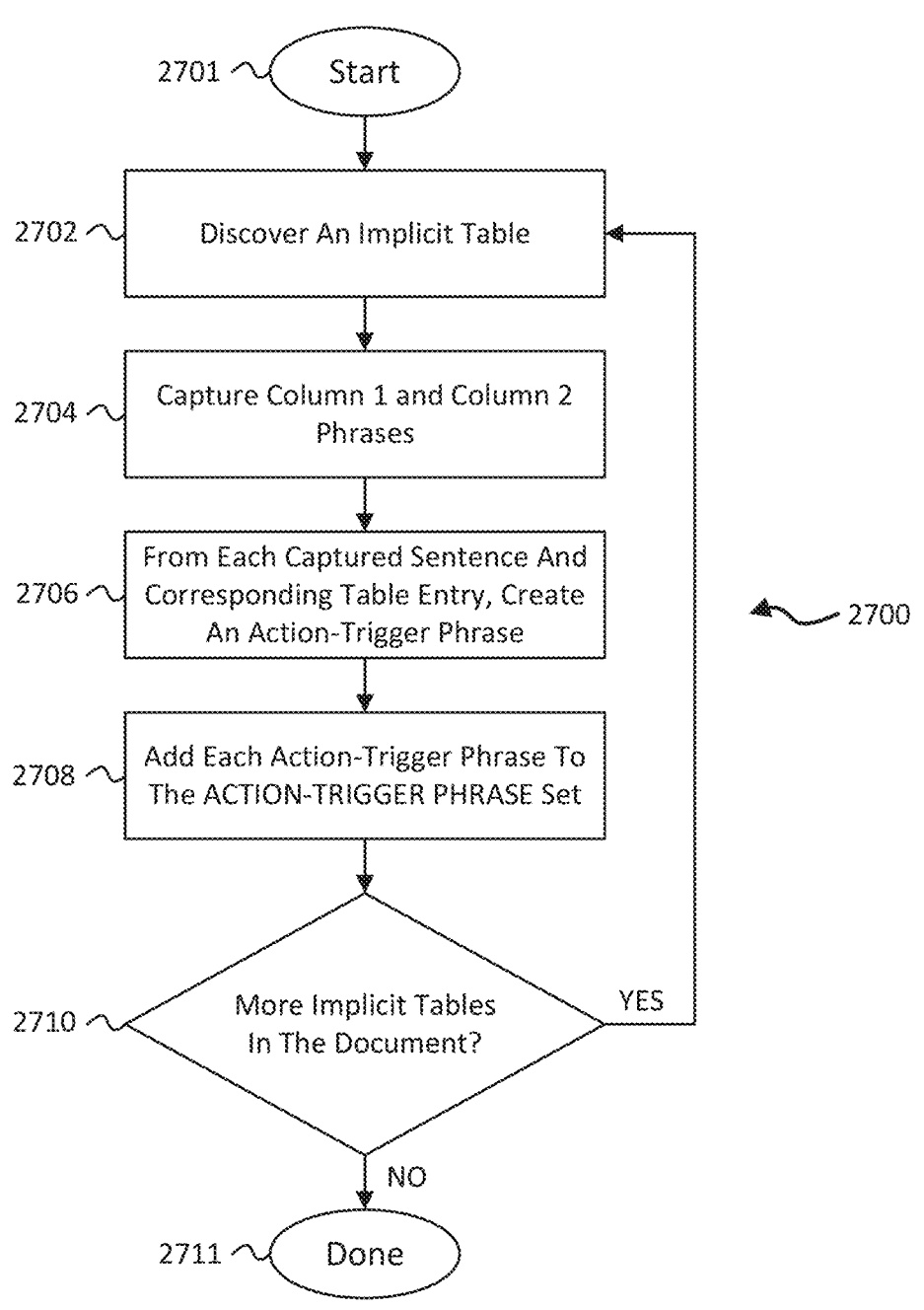
FIG. 27 is a flow diagram, according to one example embodiment of the present invention.

FIG. 27 is a more detailed flow diagram of the processing for implicit tables 2700, for step 2014 of FIG. 20 by the processor. Flow begins at 2701. At 2702, an implicit table is discovered. At 2704, column 1 and column 2 phrases are captured. At 2706, from each captured sentence and corresponding table, the processor creates an action-trigger phrase, and at 2708, adds it to the ACTION-TRIGGER PHRASE set. At 2710, the processor determines if there are more implicit tables in the document. If "YES", the process repeats at 2702. If "NO", flow ends at 2711.

Figure 28:
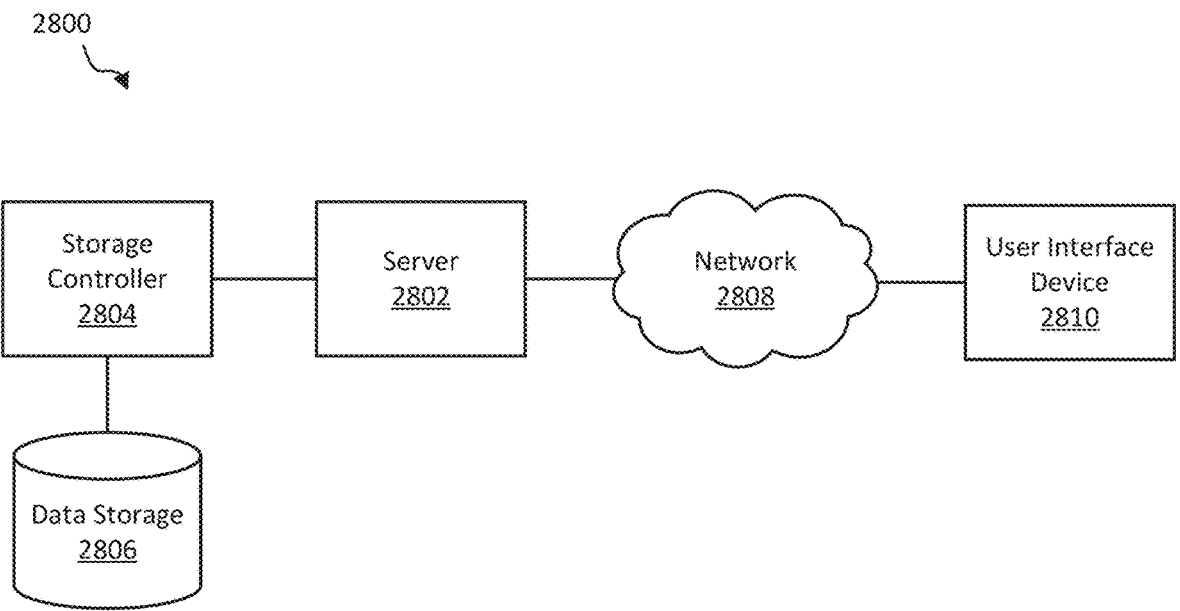
FIG. 28 is a block diagram illustrating a computer network, according to one example embodiment of the present invention.

FIG. 28 illustrates one embodiment of a system 2800 for an information system, which may host virtual machines. The system 2800 may include a server 2802, a data storage device 2806, a network 2808, and a user interface device 2810. The server 2802 may be a dedicated server or one server in a cloud computing system. The server 2802 may also be a hypervisor-based system executing one or more guest partitions. The user interface device 2810 may be, for example, a mobile device operated by a tenant administrator. In a further embodiment, the system 2800 may include a storage controller 2804, or storage server configured to manage data communications between the data storage device 2806 and the server 2802 or other components in communication with the network 2808. In an alternative embodiment, the storage controller 2804 may be coupled to the network 2808.

In one embodiment, the user interface device 2810 is referred to broadly and is intended to encompass a suitable processor-based device such as a desktop computer, a laptop computer, a personal digital assistant (PDA) or tablet computer, a smartphone or other a mobile communication device having access to the network 2808. The user interface device 2810 may be used to access a web service executing on the server 2802. When the device 2810 is a mobile device, sensors (not shown), such as a camera or accelerometer, may be embedded in the device 2810. When the device 2810 is a desktop computer the sensors may be embedded in an attachment (not shown) to the device 2810. In a further embodiment, the user interface device 2810 may access the Internet or other wide area or local area network to access a web application or web service hosted by the server 2802 and provide a user interface for enabling a user to enter or receive information.

The network 2808 may facilitate communications of data, such as dynamic license request messages, between the server 2802 and the user interface device 2810. The network 2808 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 2810 accesses the server 2802 through an intermediate sever (not shown). For example, in a cloud application the user interface device 2810 may access an application server. The application server may fulfill requests from the user interface device 2810 by accessing a database management system (DBMS). In this embodiment, the user interface device 2810 may be a computer or phone executing a Java application making requests to a JBOSS server executing on a Linux server, which fulfills the requests by accessing a relational database management system (RDMS) on a mainframe server.

Figure 29:
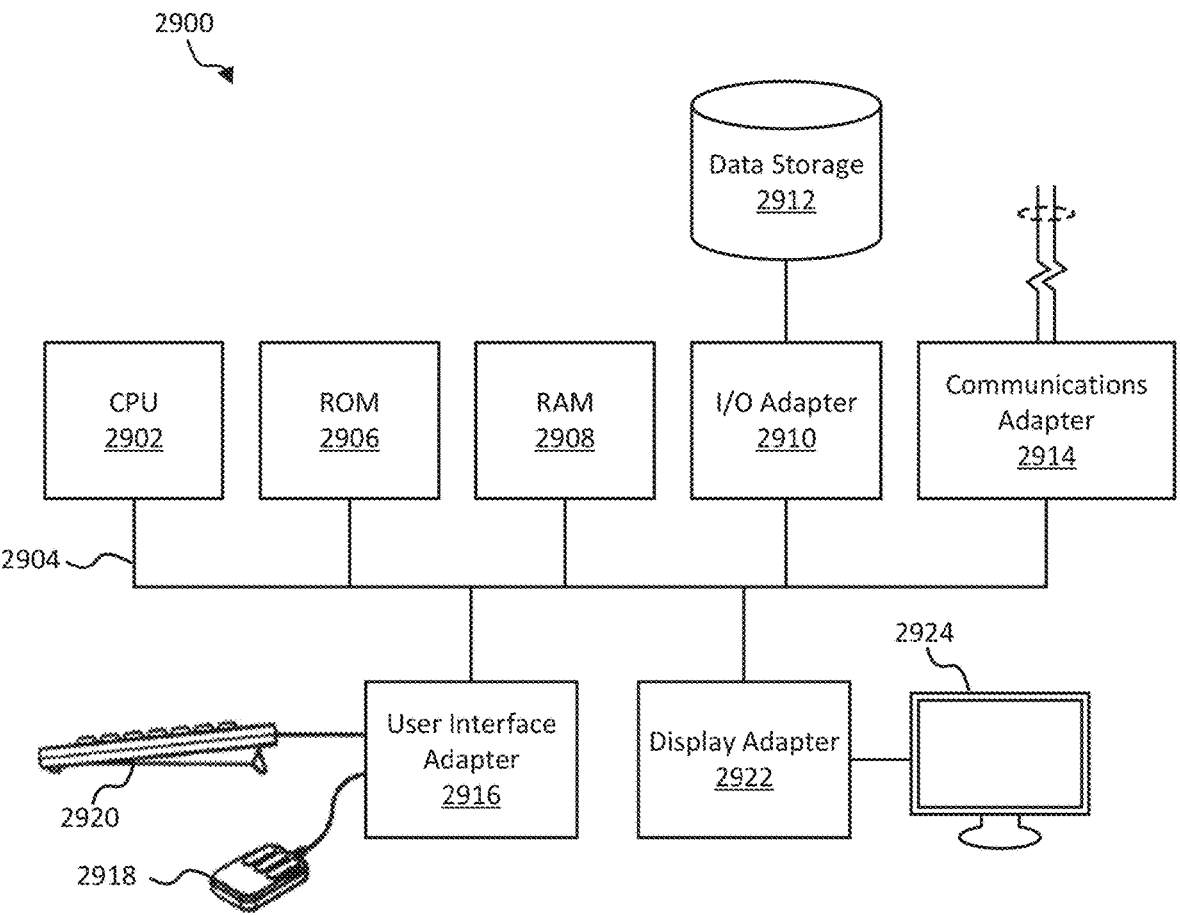
FIG. 29 is a block diagram illustrating a computer system, according to one example embodiment of the present invention.

FIG. 29 illustrates a computer system 2900 adapted according to certain embodiments of the server 2802 and/or the user interface device 2810. The central processing unit ("CPU") 2902 is coupled to the system bus 2904. The CPU 2902 may be a general purpose CPU or microprocessor, graphics processing unit ("GPU"), and/or microcontroller. The present embodiments are not restricted by the architecture of the CPU 2902 so long as the CPU 2902, whether directly or indirectly, supports the operations as described herein. The CPU 2902 may execute the various logical instructions according to the present embodiments.

The computer system 2900 also may include random access memory (RAM) 2908, which may be synchronous RAM (SRAM), dynamic RAM (DRAM), synchronous dynamic RAM (SDRAM), or the like. The computer system 2900 may utilize RAM 2908 to store the various data structures used by a software application. The computer system 2900 may also include read only memory (ROM) 2906 which may be PROM, EPROM, EEPROM, optical storage, or the like. The ROM may store configuration information for booting the computer system 2900. The RAM 2908 and the ROM 2906 hold user and system data, and both the RAM 2908 and the ROM 2906 may be randomly accessed.

The computer system 2900 may also include an input/output (PO) adapter 2910, a communications adapter 2914, a user interface adapter 2916, and a display adapter 2922. The I/O adapter 2910 and/or the user interface adapter 2916 may, in certain embodiments, enable a user to interact with the computer system 2900. In a further embodiment, the display adapter 2922 may display a graphical user interface (GUI) associated with a software or web-based application on a display device 2924, such as a monitor or touch screen.

The I/O adapter 2910 may couple one or more storage devices 2912, such as one or more of a hard drive, a solid state storage device, a flash drive, a compact disc (CD) drive, a floppy disk drive, and a tape drive, to the computer system 2900. According to one embodiment, the data storage 2912 may be a separate server coupled to the computer system 2900 through a network connection to the I/O adapter 2910. The communications adapter 2914 may be adapted to couple the computer system 2900 to the network 2908, which may be one or more of a LAN, WAN, and/or the Internet. The communications adapter 2914 may also be adapted to couple the computer system 2900 to other networks such as a global positioning system (GPS) or a Bluetooth network. The user interface adapter 2916 couples user input devices, such as a keyboard 2920, a pointing device 2918, and/or a touch screen (not shown) to the computer system 2900. The keyboard 2920 may be an on-screen keyboard displayed on a touch panel. Additional devices (not shown) such as a camera, microphone, video camera, accelerometer, compass, and or gyroscope may be coupled to the user interface adapter 2916. The display adapter 2922 may be driven by the CPU 2902 to control the display on the display device 2924. Any of the devices 2902-2922 may be physical and/or logical.

The applications of the present disclosure are not limited to the architecture of computer system 2900. Rather the computer system 2900 is provided as an example of one type of computing device that may be adapted to perform the functions of a server 2802 and/or the user interface device 2810. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 2900 may be virtualized for access by multiple users and/or applications. The applications could also be performed in a serverless environment, such as the cloud.

Figure 30:
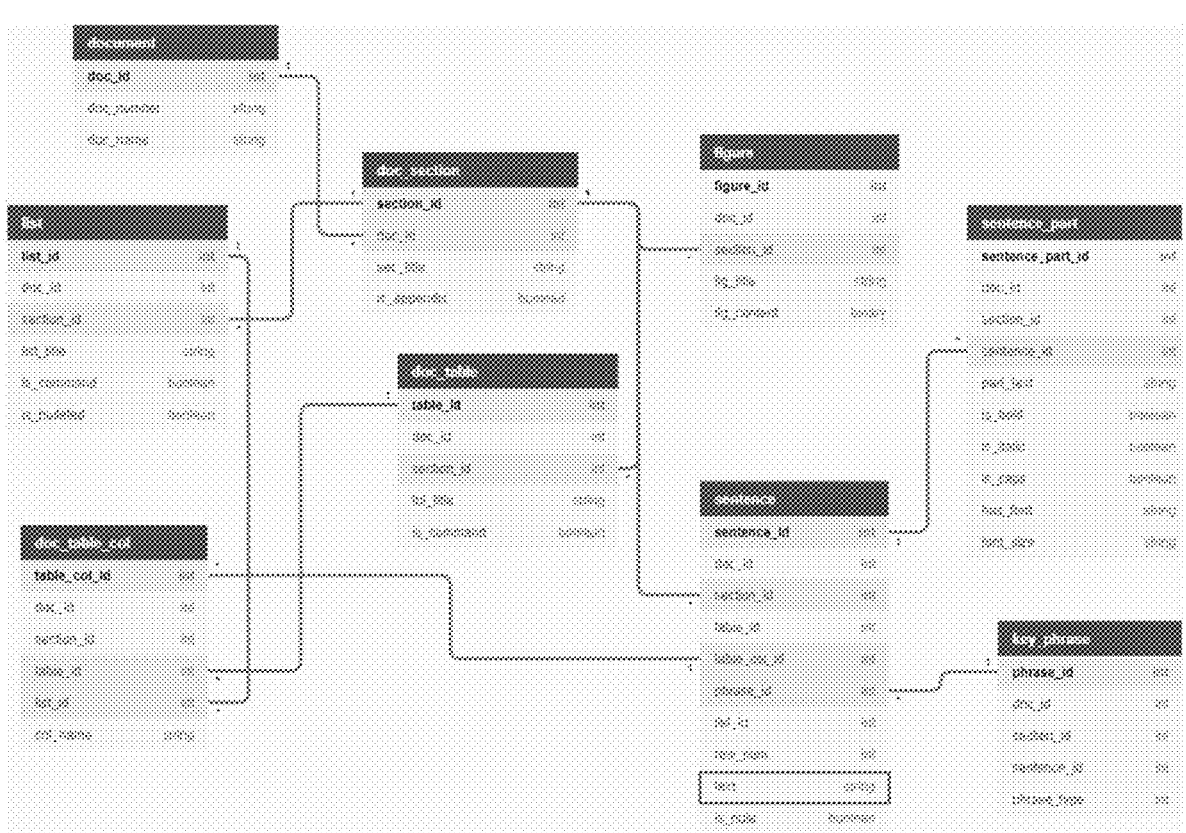
FIG. 30 is an illustration of an RDMS database design, according to one example embodiment of the present invention.

Referring to FIG. 30, an example RDMS database design 3000 is shown that can be used in implementations of the present disclosure.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. A serverless environment, such as the cloud, could also be used.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. A serverless environment, such as the cloud, could also be used.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

We claim:

1. A computer-implemented method of parsing implicit tables within a document and creating a trained database, the method comprising:

collecting, by a processor, one or more documents in a document corpus, wherein the one or more documents in the document corpus exists in any format;

creating, by the processor, a set of sentences that captures domain specific terminology in the document corpus based on a formalized writing style of the one or more documents in the document corpus to capture the domain-specific terminology from the document corpus via a text selector that is agnostic to a container mechanism of the one or more documents in the document corpus;

training, by the processor, a neural network tailored for terminology specific to the document corpus using the set of sentences that captures domain specific terminology in the document corpus, wherein the set of sentences is vectorized and passed simultaneously in a trainable transformer structure including at least one of a Siamese and a triplet network architecture structure to derive semantically meaningful sentence embeddings that can be compared with cosine-similarity;

parsing, by the processor, a document of the one or more documents from the document corpus to determine a pattern for a set of text that sets apart the information contained therein from the rest of the text;

determining, by the processor, from the pattern of spacing, a first descriptive phrase and a second descriptive phrase;

assigning, by the processor, the first descriptive phrase as an action and the second descriptive phrase as a trigger, wherein the trigger is a potential match for a user query and the action is a related task, and wherein the trigger is text against which the neural network compares the user query for the potential match and the action is a potential user action or topic, discovered by query processing by a neural network match between the user query and the trigger;

adding, by the processor, the action and trigger to an action-trigger phrase set;

accessing the neural network tailored for the document corpus; and creating, by the processor, the trained database by applying the neural network to the action-trigger phrase set, wherein the trained database is trained on the domain specific terminology and action-trigger phrase from the document corpus.

2. The method of claim 1, further comprising parsing a user query against the action-trigger phrase set to improve the efficiency of processing the user query.

3. The method of claim 2, wherein a cosine similarity score is computed between the query and the trigger.

4. The method of claim 1, wherein the pattern includes spacing.

5. The method of claim 1, wherein the spacing includes indenting or tabs.

6. The method of claim 1, wherein the pattern includes bold text or bulleted text.

7. The method of claim 1, wherein the pattern includes repetition.

8. The method of claim 1, wherein the implicit table can be nested.

9. The method of claim 1, wherein the implicit table can be nested in an implicit or explicit table.

10. A computer program product, comprising:

a non-transitory computer readable medium comprising instructions which, when executed by a processor of a computing system, cause the processor to perform the steps of:

collecting one or more documents in a document corpus, wherein the one or more documents in the document corpus exists in any format;

creating a set of sentences that captures domain specific terminology in the document corpus based on a formalized writing style of the one or more documents in the document corpus to capture the domain-specific terminology from the document corpus via a text selector that is agnostic to a container mechanism of the one or more documents in the document corpus;

training a neural network tailored for terminology specific to the document corpus using the set of sentences that captures domain specific terminology in the document corpus, wherein the set of sentences is vectorized and passed simultaneously in a trainable transformer structure including at least one of a Siamese and a triplet network architecture structure to derive semantically meaningful sentence embeddings that can be compared with cosine-similarity;

parsing a document of the one or more documents from a document corpus to determine a pattern for a set of text that sets apart the information contained therein from the rest of the text;

determining from the pattern of spacing, a first descriptive phrase and a second descriptive phrase;

assigning the first descriptive phrase as an action and the second descriptive phrase as a trigger, wherein the trigger is a potential match for a user query and the action is a related task, and wherein the trigger is text against which the neural network compares the user query for the potential match and the action is a potential user action or topic, discovered by query processing by a neural network match between the user query and the trigger;

adding the action and trigger to an action-trigger phrase set;

accessing the neural network tailored for the document corpus; and creating a trained database by applying the neural network to the action-trigger phrase set, wherein the trained database is trained on the domain specific terminology and the action-trigger phrase from the document corpus.

11. The computer program product of claim 10, further comprising parsing a user query against the action-trigger phrase set to improve the efficiency of processing the user query.

12. The computer program product of claim 11, wherein a cosine similarity score is computed between the query and the trigger.

13. The computer program product of claim 10, wherein the pattern includes spacing.

14. The computer program product of claim 10, wherein the spacing includes indenting or tabs.

15. The computer program product of claim 10, wherein the pattern includes bold text or bulleted text.

16. The computer program product of claim 10, wherein the pattern includes repetition.

17. The computer program product of claim 10, wherein the implicit table can be nested.

18. The computer program product of claim 10, wherein the implicit table can be nested in an implicit or explicit table.

\* \* \* \* \*